(12) United States Patent
Hill

(10) Patent No.: US 12,077,284 B2
(45) Date of Patent: Sep. 3, 2024

(54) ROTORCRAFT

(71) Applicant: HILL GROUP TECHNOLOGIES LIMITED, Stafford (GB)

(72) Inventor: Jason Hill, Rugeley (GB)

(73) Assignee: HILL GROUP TECHNOLOGIES LIMITED

( * ) Notice: Subject to any disclaimer, the term of this patent is extended or adjusted under 35 U.S.C. 154(b) by 0 days.

(21) Appl. No.: 18/022,506

(22) PCT Filed: Aug. 23, 2021

(86) PCT No.: PCT/GB2021/052184
§ 371 (c)(1),
(2) Date: Feb. 21, 2023

(87) PCT Pub. No.: WO2022/038382
PCT Pub. Date: Feb. 24, 2022

(65) Prior Publication Data
US 2023/0356831 A1    Nov. 9, 2023

(30) Foreign Application Priority Data

| Aug. 21, 2020 | (GB) | 2013111 |
| Aug. 21, 2020 | (GB) | 2013137 |
| Oct. 21, 2020 | (GB) | 2016721 |

(51) Int. Cl.
| *B64C 27/06* | (2006.01) |
| *B64C 1/00* | (2006.01) |
| *B64C 25/10* | (2006.01) |
| *B64C 25/52* | (2006.01) |
| *B64C 27/605* | (2006.01) |
| *B64D 27/02* | (2006.01) |
| *B64D 41/00* | (2006.01) |

(52) U.S. Cl.
CPC ............... *B64C 27/06* (2013.01); *B64C 1/00* (2013.01); *B64C 25/10* (2013.01); *B64C 25/52* (2013.01); *B64C 27/605* (2013.01); *B64D 27/02* (2013.01); *B64D 41/00* (2013.01); *B64C 2001/0072* (2013.01); *B64D 2041/005* (2013.01)

(58) Field of Classification Search
CPC .......... B64C 27/04; B64C 27/06; B64C 1/00; B64C 25/10; B64C 25/52; B64C 27/605; B64C 2001/0072; B64C 7/00; B64C 25/34; B64C 27/12; B64D 27/02; B64D 41/00; B64D 2041/005; B64D 35/08; Y02T 50/40
See application file for complete search history.

(56) References Cited

U.S. PATENT DOCUMENTS

2019/0023393 A1* 1/2019 Schwaiger .............. B64C 27/22

* cited by examiner

*Primary Examiner* — Valentina Xavier
(74) *Attorney, Agent, or Firm* — Bochner PLLC; Andrew D. Bochner

(57) ABSTRACT

A light helicopter typically for 5 occupants is disclosed which achieves a hitherto unprecedented combination of range, speed and payload by adopting a novel approach to construction and positioning of components which affect overall aerodynamics in forward flight at speeds in excess of 70 metres per second and mass distribution and management of centre of gravity as fuel is consumed, load bearing strength and drag.

20 Claims, 21 Drawing Sheets

ROTORCRAFT

FIELD OF THE INVENTION

The present application relates to helicopters, in particular to lightweight helicopters for carrying at most 6 occupants.

BACKGROUND OF THE INVENTION

Helicopters have been known for some time with the term itself being coined in the 19$^{th}$ century and the Focke-Wulf FW 61 being the first operational helicopter in 1936. Since then designs have evolved considerably, but while helicopters offer significant advantage over fixed wing aircraft by being able to take off and land vertically, they have always tended to be limited in terms of payload, range and forward speed.

Ultimate forward speed limits are in part due to problems of the advancing blade tip velocity approaching or exceeding the speed of sound and/or retreating blade stall which makes achieving forward speeds in excess of 250 knots (about 130 m/s) problematic. However, power, fuel, weight, drag and manufacturing ease and cost considerations generally mean that few practical designs have come close to this limit, despite many literally trillions of pounds, dollars and euros worth of research effort by teams of highly skilled engineers and scientists in both civil and military engineering over many decades. The problem is particularly acute for light helicopters where weight and payload are more of an issue and the weight of fuel required to power the helicopter for any appreciable time becomes comparable to the weight of the structure.

When discussing aircraft speeds, two measures are important: fast cruise speed and never exceed speed ($V_{ne}$). The fast cruise speed is the speed which the aircraft is designed to maintain in continuous level flight at a sustainable engine power output at or below the continuous power and torque limits of the aircraft's power plant or transmission, and is sometimes limited by fuel economy and component life and vibration considerations. Some military aircraft (typically fixed wing) may be able to exceed this speed for short periods of time (for example fixed wing jets with reheat) under their own power and most aircraft have structures which can tolerate speeds (for example in descent under power) significantly higher, up to the $V_{ne}$ being the speed at which structural considerations become a limitation.

Whilst helicopters and fixed wing aircraft are generally faster in flight than cars or ground-based transport, there are constraints on landing areas from which they can operate and this means they need to travel at an appreciable speed over an appreciable distance in order to save time overall as compared to travelling by land.

As a practical consideration, to provide an effective alternative to ground based travel it has been considered that a light aircraft should be capable of transporting a pilot plus 3 or 4 others (or perhaps exceptionally 5 others) at a cruise speed in excess of about 135 knots (70 m/s) with fuel sufficient for a range of at least about 340 nm or 625 km or about 2.5 hours at cruise speed plus legally required reserves and take-off and landing fuel. If the range is materially less then, particularly factoring for adverse wind possibilities, practical journeys may require fuel stops which reduces the net benefit as compared to travelling by land. If the speed is slower, even if fuel is not a limit, range may be limited by the need to land for passenger comfort. This speed and range requirement is in fact achieved by many single engine fixed wing aircraft at reasonable fuel requirements.

However only a few commercial helicopter designs have exceeded a design cruise speed in excess of 135 knots (70 m/s). These tend to be larger twin-engine designs, with large overall weights and significant power or fuel requirements, making them very expensive to manufacture and operate and therefore limited to specialist use.

For private use and for safety, it is also desirable to have a $V_{ne}$ significantly higher than the intended cruise speed, and a $V_{ne}$ at least 20 knots higher or 10 m/s higher than the cruise speed, or 155 knots or 80 m/s is desirable.

There are only a few single-engine light helicopter designs which have achieved reasonable speeds, approaching or exceeding the 135 knot threshold. However, it is important to note that weight and fuel burn are important considerations, so while a design may have a reasonable speed at maximum power it will typically have a high fuel burn and greatly reduced range at that speed and the maximum range may be quoted without specifying fuel reserves required legally or for prudence and at a much lower cruise speed. Similarly, while an aircraft may have seating for 5 or 6 it typically will not have a weight capability to carry seats full of people plus a tank full of fuel and so the range with 5 people at maximum cruise speed with legal reserves may be extremely limited. Thus, some light helicopters may be able to travel fast and carry 5 people and travel a significant range, but they cannot do all three on the same flight.

The MD500 is one helicopter design which comes close to approaching the capabilities of light aircraft as mentioned above. The MD500 has a claimed cruise speed of 135 knots but a $V_{ne}$ of only 152 knots. For safety, it is also desirable to have a $V_{ne}$ significantly higher than the intended cruise speed, and a $V_{ne}$ at least 20 knots higher or 10 m/s higher than the cruise speed, or at least 155 knots or 80 m/s would be desirable. It achieves its speed partly by being very light. It has a limited maximum take-off mass and the rear seats are cramped and the mast protrudes into the cabin so, although it can physically seat 5, it cannot carry much fuel when fully loaded and is not practical for 5 adults for any serious distance. The range is limited even when lightly loaded and the claimed cruise speed which is very close to the $V_{ne}$ is generally not achieved in practice when fully loaded.

The SA341 Gazelle is another helicopter and is one of the fastest helicopter designs made and has achieved speed records. It can attain speeds of 167 knots. However, being essentially military in origin it achieves its high speed at significant fuel burn by use of significant power (approximately 450 kW) and the range at high speed and/or with passengers is limited. Its maximum cruise speed is about 140 knots and economical cruise speed is about 125 knots and its range at maximum cruise speed without additional fuel is under 400 km.

It has been a long-established desire of researchers to make helicopters fly faster and further on an economical amount of fuel and much research and development has been poured into every aspect of helicopter design to try to achieve this. The cabin clearly has the major cross-sectional area and it can be seen that both the MD500 and SA341 have streamlined cabin designs. Aerodynamic considerations for a helicopter are complicated by the fact that the airflow is substantially vertically downward in a hover and then transitions to having an increasing backward component over the body in forward flight, and a helicopter must remain stable in a low speed sideways or backwards hover whereas a fixed wing aircraft only has airflow from forward motion. Despite sustained research efforts, the best conventional helicopter designs cannot generally equal the speed and range of considerably less expensive piston powered light aircraft and so are less favoured unless vertical take-off and landing is essential and justifies the cost.

The primary way to improve the range, payload, hover power and to some extent speed of light helicopters is to reduce their empty mass relative to their payload. Due to fundamental design consideration differences between aircraft of different sizes, such as the importance of the weight of additional components, the performance of heavier helicopters is often improved instead with aerodynamic features and greater power afforded by larger or more engines. Moreover as helicopters become lighter, the mass of payload and fuel becomes more significant as does its position so lighter helicopters tend to have limited range.

It has been appreciated from analysis and experimentation pursuant to the invention of the complex airflows around a helicopter in high speed forward flight that, although seemingly relatively small in comparison to the main cabin, the skids and rotor hub of light helicopters contribute surprisingly significant parasitic drag that can in fact by techniques disclosed herein be effectively reduced even in a light helicopter. Power required to overcome parasitic drag increases cubically with speed.

Larger helicopters generally have landing gear comprising wheels, in part because they need to be towed due to their weight (whereas light helicopters up to 2000 kg can readily be moved with simple ground handling equipment resembling a forklift or pallet moving equipment) and in part because they are large enough that the weight of movable wheels can be tolerated plus the helicopter body is wide enough and strong enough to give a reasonable track width for stability (sometimes with stub wings) when the weight is on the main wheels. Light helicopters, however, have universally used skids as they can reliably give a wider track with minimal weight and distribute loads over 4 fixing points to the helicopter. Some novel aspects of the invention enable a retractable landing gear to be provided in a light helicopter.

The helicopter rotor hub and pylon must take all the forces of the weight of the helicopter (when manoeuvring at increased g) and blade pitch control linkages are needed to control the blades, for ease of inspection and maintenance these are generally exposed in existing designs. Further novel aspects of the invention provide a rotor hub with greatly reduced drag.

SUMMARY OF THE INVENTION

Pursuant to the invention it has been appreciated that a helicopter can be produced which achieves a combination of speed, range and payload simply unequalled in prior art designs despite nearly a century of extensive research.

Aspects of the invention are set out in the independent claims and preferable features are set out in the dependent claims. A number of aspects of different components of the helicopter are set out below. While each aspect will provide an improvement in performance, it will be appreciated that different aspects may also be implemented in conjunction with each other on the same helicopter. Moreover, synergistic effects from some combinations of the aspects below will lead to a significantly improved performance over helicopters implementing none or only one of the aspects described. In summary, the skilled person will appreciate that aspects described below and their preferred features may be implemented alone or in combination and preferred features of one aspect may be applied to other aspects.

Parameters and Performance

There is described herein a light helicopter having an occupant capacity of at least 4 occupants and at most 6 occupants including a pilot, the helicopter having a longitudinal axis and an empty mass of less than 1000 kg and a maximum gross mass of between 1000 kg (preferably 1050 kg) and 2000 kg, the helicopter comprising:

a fuselage elongate along the longitudinal axis, the fuselage comprising an aerodynamically shaped shell defining a front, a rear, a top and a bottom of the fuselage and a passenger cabin therein having two forward-facing front seating positions for the pilot and a co-pilot or a passenger, and forward-facing rear seating positions for at least 2 passengers, optionally 3 passengers, the shell being formed from a composite material and being load-bearing, the cabin having a maximum width of between 1200 mm and 2000 mm, preferably between 1250 mm and 1950 mm at a section located longitudinally proximately to the rear seating positions, a primary fuel cell mounted substantially behind the passenger cabin, and he fuselage having a frontal cross-sectional area of between 1.75 $m^2$, optionally 2 $m^2$, and 4 $m^2$, tapering substantially smoothly to the tail boom assembly, and having a forward fuselage length from a nose at the front of the fuselage to a tail boom bulkhead (at the rear of the fuselage) of at least 3500 mm;

a tail boom assembly extending from the tail boom bulkhead (or rear of the fuselage) and including a tail rotor;

a main rotor assembly comprising a hub, at least two main rotor blades mounted by a rotor mast to the top of the fuselage to permit the main rotor blades to rotate with respect to the fuselage, and a swashplate assembly, the swashplate assembly having a rotatable upper swashplate coupled by upper control links to the main rotor blades and a lower swashplate coupled to cyclic and collective controls, the main rotor assembly having a centre of rotation at a rotor hub location between 2500 mm and 3500 mm, preferably around 3100 mm, along the longitudinal axis from the front of the fuselage, the front seating position for the pilot having a centre of mass at a first location substantially in front of the rotor hub location, and a primary fuel cell having a centre of mass at a second location substantially behind the rotor hub location;

a landing gear arrangement; and a power plant mounted substantially above and behind the passenger cabin, wherein the primary fuel cell is arranged to provide fuel to the power plant;

wherein in level forward flight at 70 m/s in an International Standard Atmosphere at an altitude of 600 m with a total mass of 1650 kg the helicopter has an equivalent flat plate drag of 0.6 $m^2$ or less, preferably 0.5 $m^2$ or less, resulting in total effective drag of less than 3500, preferably less than 1500 N and a total power consumption required to sustain said level forward flight of less than 250, preferably less than 230 kW.

This configuration can enable a sufficiently low drag in order to achieve a cruising speed of 70 m/s or more with a power consumption of 250 kW or less. The mass and aerodynamic adjustments made to this extent can allow the helicopter to be operated using a single engine, further improving the mass and cruising speed of the helicopter. It is normal in a light helicopter to have the centre of mass of the fuel cell generally under the mast or sometimes forward of it under the cabin unless it is small because of balance issues as the centre of gravity will move as fuel burns.

The term "empty mass" as used herein refers to the mass of the helicopter without any fuel, occupants or other cargo including but not limited to luggage. The term "maximum gross mass" as used herein refers to the maximum total mass of the helicopter and its contents with which the helicopter can take off. This mass can include but is not limited to occupants, fuel and cargo such as luggage. Other terms such as "maximum gross weight", "maximum take-off mass" and "maximum take-off weight" may be used synonymously with maximum gross mass. The term "payload" as used herein refers to the combined mass of occupants, fuel and cargo upon take-off. When the helicopter is loaded with its maximum gross mass, the payload is the difference between the maximum gross mass and the empty mass. Additionally or alternatively, the term "payload" may be used to refer to the combined mass of occupants and cargo, but excluding the mass of fuel. In this case, the term "useful payload" may be used synonymously with payload.

The term "aerodynamic" as used herein refers to the shape of a surface, a cross-section, a volume or any other part of a helicopter which experiences an airflow therearound. A shape is aerodynamic if it has generally smooth contours defining a substantially continuous surface providing reduced, little, or minimal resistance to an airflow. Aerodynamic shapes include but are not limited to streamlined convex surfaces such as aerofoils and teardrops.

The term "load-bearing" as used herein refers to a structure or component's ability to withstand tensile, compressive and/or shear loading without permanently deforming. In the case of the shell, the shell is load-bearing such that it has a load path from a landing gear attachment point and no additional support or structural members are required for the purpose of bearing the weight of the helicopter. In the field of aviation, tests to test different loading conditions such as static loading tests are required by regulation, so the loading of a fuselage and/or a shell is a known measured parameter.

The maximum width of the cabin is a maximum width of a portion of the shell containing the cabin and includes a thickness of the cabin, where the width is substantially horizontal and perpendicular to the longitudinal axis.

Any of the front, rear, top and bottom of the fuselage may be formed jointly or from a single piece of material. The front, rear, top and bottom of the fuselage may be formed from separate pieces of materials. The shell may be formed from panels of the composite material. This can allow for the easy manufacturing of the aerodynamic shell.

An additional seating position may be provided for an additional passenger. The additional seating position may be a rear-facing seat for an infant. The additional seating position may be disposed at least partially between the two front seating positions. This can allow the helicopter to hold up to 6 occupants.

The term "frontal cross-sectional area" as used herein refers to an area of a projection, for example of the helicopter, in a plane perpendicular to the direction of forward flight. The frontal cross-sectional area of the helicopter does not include the rotor blades and is considered with the helicopter in a cruising configuration, including but not limited to having any retractable landing gear stowed. The terms "frontal area" and "cross-sectional area" may be used synonymously with frontal cross-sectional area.

The fuselage may taper to the tail boom assembly such that a transition with a continuous outer surface is formed therebetween. The fuselage may taper to the tail boom assembly such that at least one profile thereof forms a continuous curve.

The term "composite material" as used herein refers to a material made from two or more constituent materials. The composite material generally has a higher stiffness and/or Young's modulus than at least one of the constituent materials. The composite material generally comprises reinforcing fibres embedded in a matrix structure. Examples of composite materials include carbon, glass or aramid fibres either singularly or in combination along with epoxy, phenolic, polyester or other such resin systems. The composite structure will also include honeycomb and/or foam-based or other low density core materials and adhesive joints with additional mechanical fastening elements such as rivets and metal inserts.

The lower swashplate is rotationally stationary about an axis of rotation of the rotor mast. The lower swashplate is arranged to move up and down along a length of the rotor mast and to rotate or tilt about axes perpendicular to the axis rotation of the rotor mast.

The term "rotor hub" as used herein refers to at least a portion of the main rotor assembly and/or a portion of the swashplate assembly. The rotor hub may include but is not limited to the central rotating hub, the rotor blade cuffs, the upper swashplate and the upper control links. The term "rotor head" may be used herein as an alternative term for "rotor hub". Moreover, the "rotor hub" described herein may simply refer to the central rotating hub to which the blades are coupled.

The term "fairing" as used herein refers to a body or a surface for shielding another body, object or component from an airflow. For example, fairings include but are not limited to aerodynamic surfaces such as a smooth shell arranged to at least partially enclose the body, object or component being shielded. A fairing can reduce the aerodynamic drag caused by the body, object or component.

The term "drag" as used herein refers to forces acting to resist the motion of the helicopter in flight in a "clean configuration". In the "clean configuration", external equipment such as flaps or a retractable landing gear arrangement are retracted or stowed. Drag may also be referred to as "clean drag". Conversely, the drag acting on the helicopter when in a "dirty configuration", e.g. with a retractable landing gear arrangement deployed or other external equipment extended, may be specifically referred to as "dirty drag".

The tail boom assembly may be formed integrally with the fuselage. The tail boom assembly may be joined to the fuselage at the rear of the fuselage. The tail rotor may be a covered or ducted fan, preferably with 7 or more tail rotor blades. The covered or ducted fan, which protects the tail rotor of a helicopter by housing it within the tail body, can improve the efficiency of the tail rotor in hover by creating additional tail rotor thrust on the induction side lips of the duct and by preventing wake contraction. In forward flight ducted fans tail rotor provide reduces parasite drag by virtue of their small side and improve aerodynamic fairing. The tail boom assembly may further comprise a tail fin integrally formed with the tail boom and adjacent the tail rotor. The tail fin may extend rearwardly beyond the tail rotor such that the tail fin defines a rearmost part of the helicopter. The tail fin can induce a lift providing a torque to act against a torque produced by the main rotor assembly, such that in forward flight, the amount of thrust required by the tail rotor to counteract the torque produced by the main rotor is reduced, allowing the overall power consumption to be reduced. The tail fin extending rearwardly of the tail rotor can allow the moment arm of the tail fin to be increased, thus increasing its counteracting torque and further reducing the power required by the tail rotor. The tail boom assembly may further comprise at least two stabilising wings projecting substantially laterally from the tail boom known as the horizontal stabiliser. The horizontal stabiliser improves the pitch stability for the helicopter and allows a level cabin attitude essential for high speed forward flight and passenger comfort. The horizontal stabiliser is typically fixed in light helicopters, but may optionally have variable pitch or moveable elements to vary the downforce generated in different flight conditions for improved performance and/or handling qualities.

Optionally, the fuselage of the helicopter comprises a forward fuselage and a rear fuselage, the forward fuselage extending from a nose at the front of the fuselage to a tail boom bulkhead and including a cabin and at least a primary fuel cell and the rear fuselage including the tail boom assembly. In some embodiments, the tail boom assembly is removable. Moreover, in some embodiments, the total length of the fuselage is less than 12000 mm and preferably more than 8000 mm, further preferably 10000 mm.

In some embodiments, the rotor mast is tilted forwards with respect to the direction of flight at an angle of between 3 degrees and 7 degrees, preferably around 5 degrees. Hence the rotor mast is tilted forward with respect to the cabin. Preferably, the rotor mast is arranged such that the fuselage, in particular the cabin, is horizontal in forward flight, for example at a speed of 70 m/s. This minimises drag in forward flight, particularly for an aerodynamically-shaped cabin optimised to be aerodynamic when flying horizontally.

In a highly preferred arrangement, the helicopter has a secondary fuel cell remote from the primary fuel cell, having a centre of mass forward of the rotor mast, optionally but desirably forward of the cabin centre of mass, optionally but desirably at least 1m forward of the centre of mass of the primary fuel cell, optionally but desirably in the nose of the aircraft. The primary and secondary fuel cells are desirably arranged so that the relative contents may be varied independently, desirably by means of a selective pumping arrangement, desirably operable to maintain centre of mass within longitudinal limits over a wider range of total fuel contents than using the primary fuel cell alone. Fuel may be drawn from and/or actively pumped to or from the secondary fuel cell in flight. In a preferred arrangement the secondary fuel cell may be selectively filled from the primary fuel cell and need not be provided with a separate fuel filler. Filling may be controlled automatically in dependence on an actual or estimated loading plan. The secondary fuel cell will typically have provision to contain at least 50 kg of fuel, preferably at least 100 kg of fuel. The secondary fuel cell may have a volume between 10% and 50% of the volume of the primary fuel cell. Surprisingly by having a fuel cell arrangement such as this, preferred embodiments can be configured to be better trimmed and have improved range and performance as compared to conventional arrangements.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Light helicopters are described by way of example only, in relation to the Figures, wherein:

FIGS. 1b to 1d show respectively a perspective view, a side view and cross-sectional views of the fuselage of the helicopter of FIG. 1a;

FIG. 1e shows a perspective view of the helicopter of FIG. 1a;

FIG. 2a shows a front view of the helicopter of FIG. 1a;

FIG. 2b shows a side view of the helicopter of FIG. 1a;

FIG. 3a shows a schematic diagram of a cross-section of the helicopter of FIG. 1a;

FIG. 3b shows a plan view schematic diagram of a cabin layout for the helicopter of FIG. 1a;

FIG. 4a shows a side view of a mass distribution apparatus of the helicopter of FIG. 1a;

FIG. 4b shows a perspective view of the mass distribution apparatus of FIG. 4a;

FIG. 4c shows a front view of the mass distribution apparatus of FIG. 4a;

FIG. 4d shows a flow chart of a mass distribution method of the helicopter of FIG. 1a;

FIG. 4e shows a flow chart of a mass distribution computing device of the helicopter of FIG. 1a;

DETAILED DESCRIPTION

Referring to FIGS. 1a to 7b, a light helicopter 100 will now be described. The helicopter 100 has an aerodynamic fuselage 1000, a tail boom assembly 1200, a main rotor assembly 2000, a power plant 3000 and a landing gear arrangement 4000. The fuselage 1000 comprises a shell 1010, where the shell 1010 defines a top 1020, bottom 1022, front 1024, rear 1026, left 1027 and right 1028 of the fuselage 1000. The fuselage 1000 also has a length 1002 from the front 1024 to the rear 1026, and a maximum width 1004.

Figure 1A:
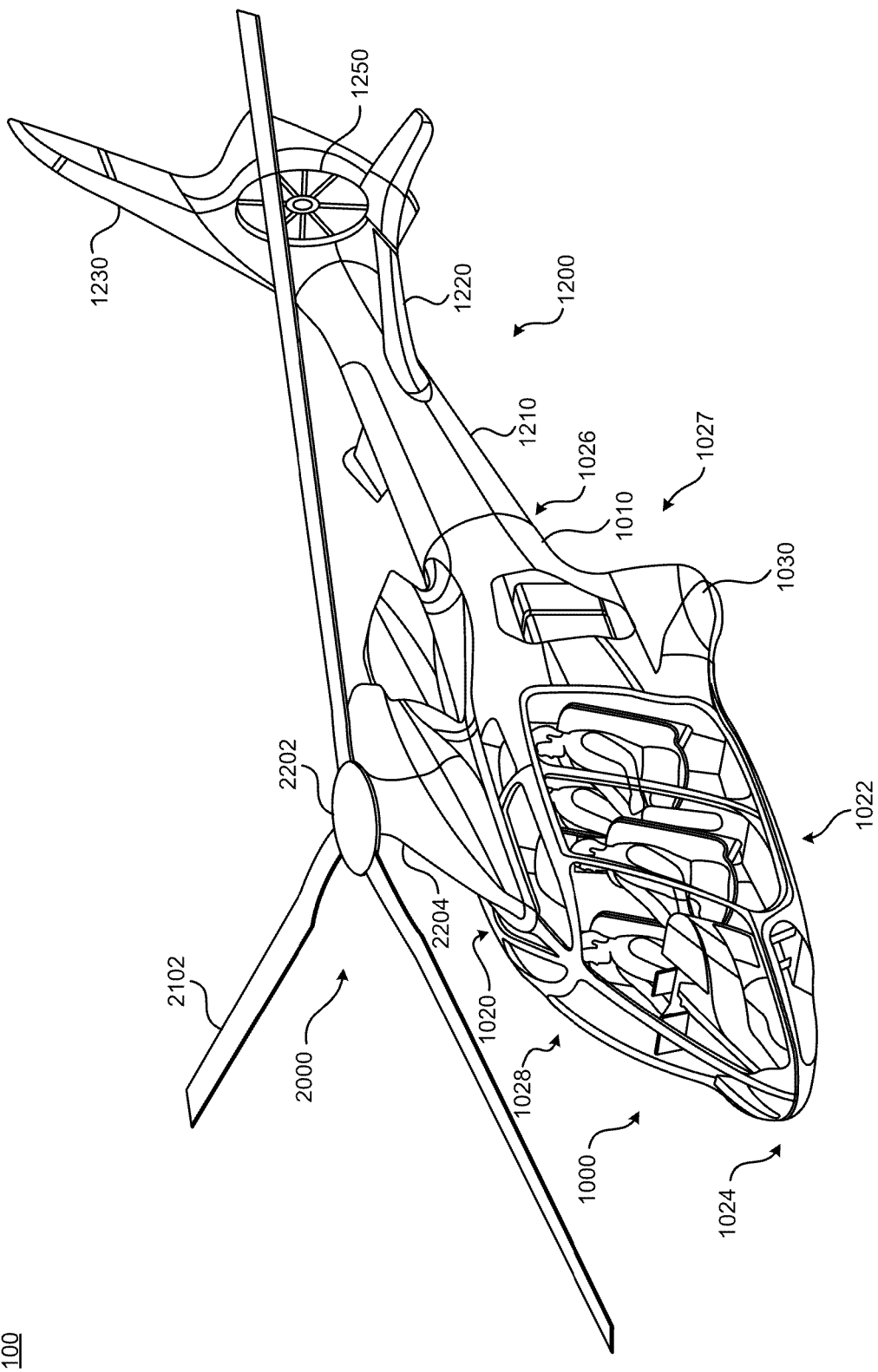
FIG. 1a shows a perspective view of an example helicopter.
Figure 1B:
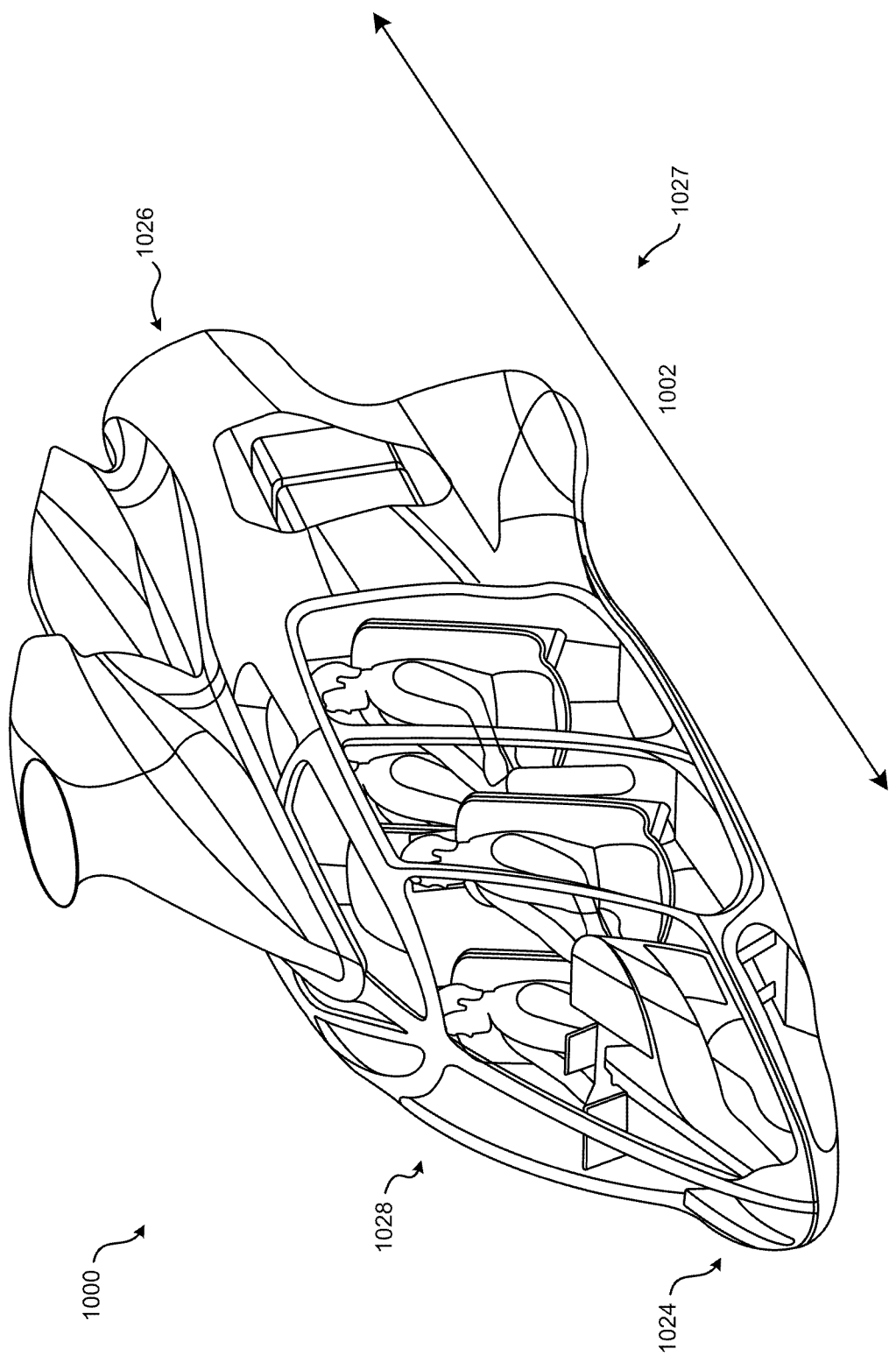
Figure 1C:
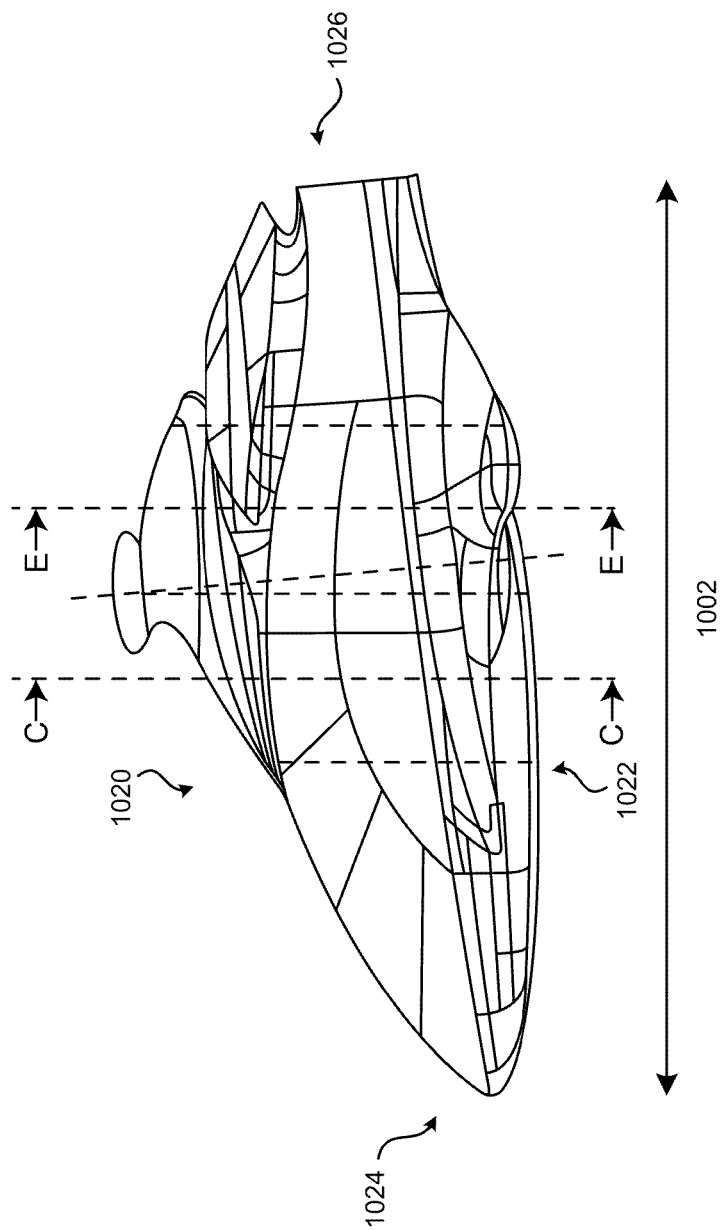
Figure 1D:
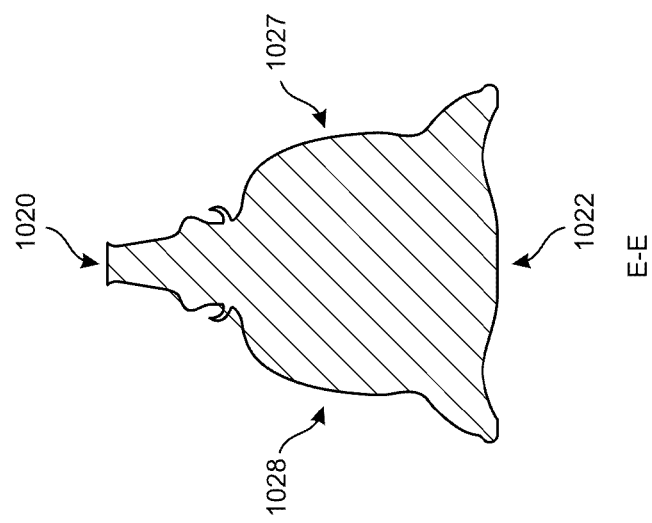
Figure 1D:
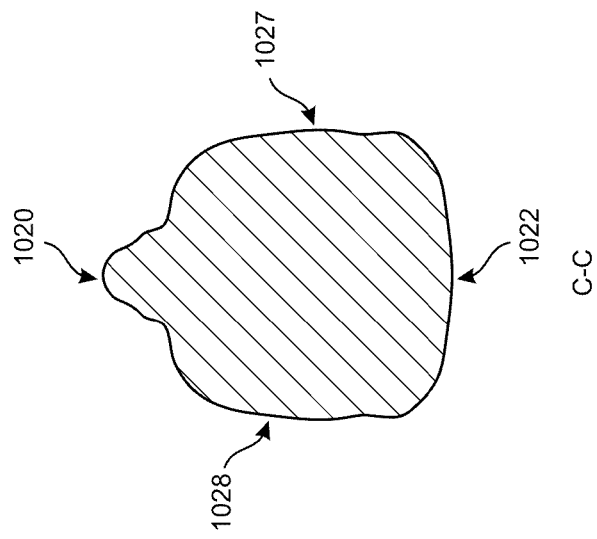
Figure 1E:
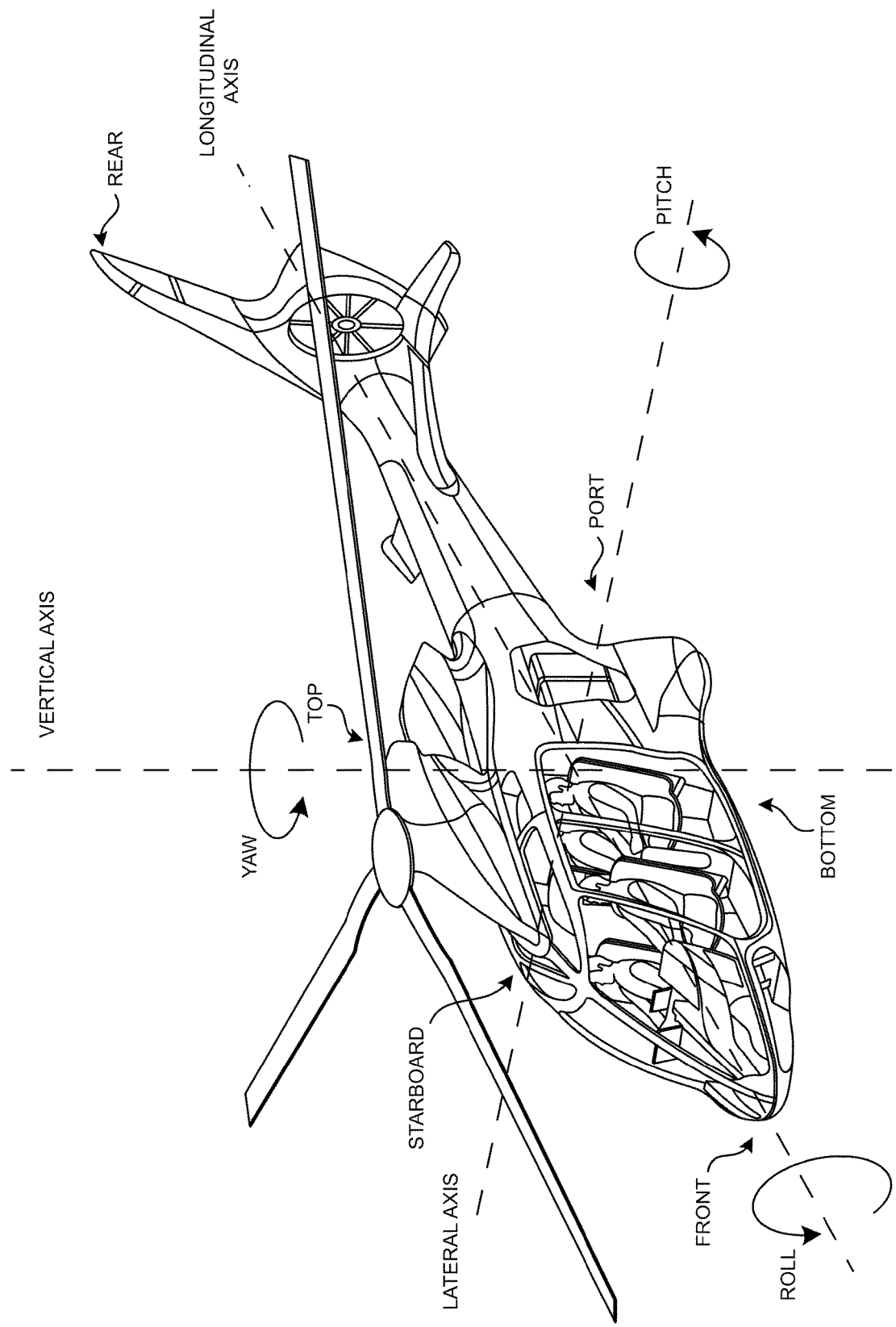
Figure 2A:
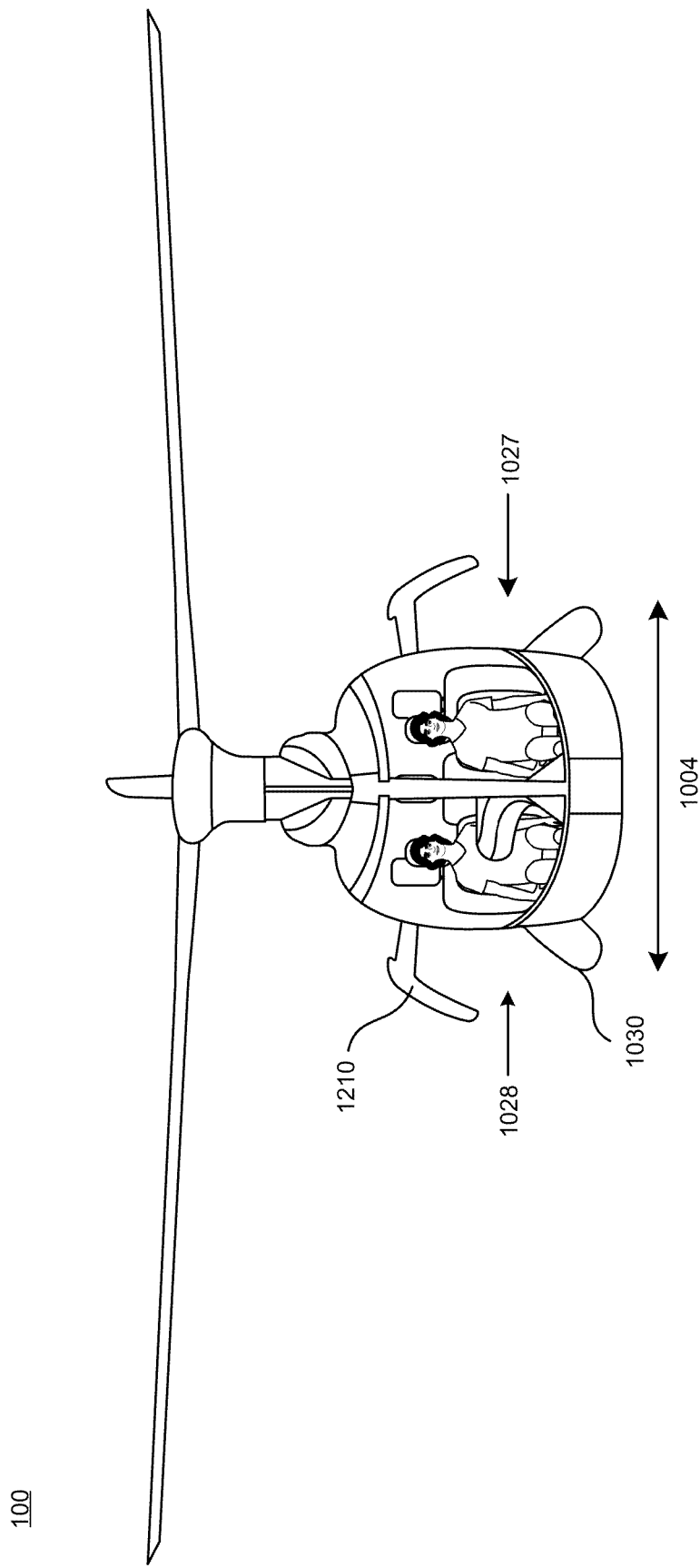
Figure 2B:
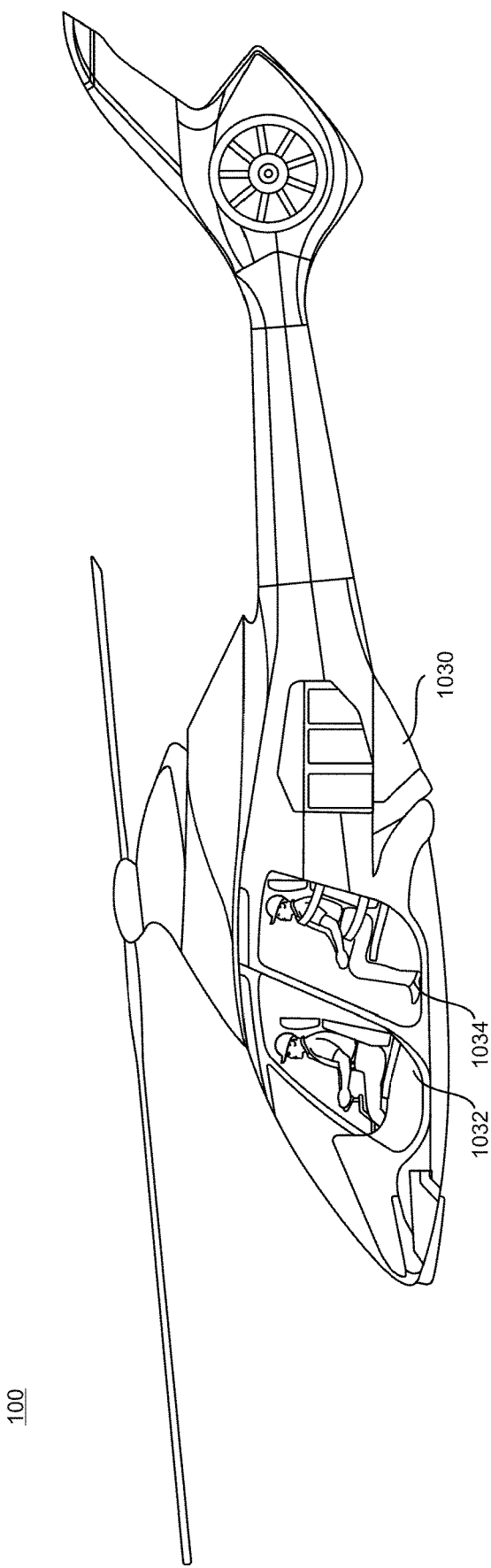

Referring to FIG. 1e, the helicopter 100 has a front, rear, left, right, top and bottom. The left and right may alternatively be referred to as port and starboard respectively. The helicopter 100 has a longitudinal axis, a lateral axis and a vertical axis. The longitudinal axis extends between the front and the rear of the helicopter 100. The lateral axis extends between the left and the right of the helicopter 100. A direction parallel to the lateral axis is a transverse direction, and in forward flight is generally horizontal and perpendicular to the direction of forward travel. An outward direction is substantially parallel to the lateral axis and away from the longitudinal axis. An inward direction is substantially parallel to the lateral axis and towards the longitudinal axis. The vertical axis extends between the top and the bottom of the helicopter 100. In forward flight, the vertical axis is substantially vertical and perpendicular to the direction of forward travel.

Standard aeronautical terms aft and fwd are used. Aft or rearward is used here to mean towards the rear of the helicopter 100 or away from the direction of forward travel. Fwd, fore or forward, is used here to mean towards the front of the helicopter 100 or towards the direction of forward travel.

A first component forward of or in front of a second component is positioned closer to the front of the helicopter 100 along the longitudinal axis than the second component, although is not necessarily positioned on the longitudinal axis itself. Similarly, a first component backward of or behind a second component is positioned closer to the rear of the helicopter 100 along the longitudinal axis than the second component, although is not necessarily positioned on the longitudinal axis itself. A first component upward of or above a second component is positioned closer to the top of the helicopter 100 along, although not necessarily on, the vertical axis than the second component. Similarly, a first component below, beneath, under or downward of a second component is positioned closer to the bottom of the helicopter 100 along the vertical axis than the second component.

Pitch of the helicopter 100 is a rotation of the helicopter 100 about the lateral axis. Yaw of the helicopter 100 is a rotation of the helicopter 100 about the vertical axis. Roll of the helicopter 100 is a rotation of the helicopter 100 about the longitudinal axis.

The helicopter 100 has a centre of gravity (CoG) or centre of mass (CoM), defined as a point in 3-dimensional space about which the weight of the helicopter 100 applies no moment force or torque. Optionally the centre of mass can be the intersection of the longitudinal, lateral and vertical axes. Rotor blades of the main rotor assembly have a centre of rotation in a plane of rotation at a rotor hub location. The rotor hub location can act as a datum location from which the location of other components of or positions in the helicopter 100 are referenced. The helicopter 100, when empty, may have a nominal centre of mass at a location longitudinally near to the rotor hub location.

The helicopter 100 has landing gear (not shown in any of FIGS. 1a to 1e) to support the helicopter 100 when on the ground. The landing gear may be fixed or retractable and may include skids or wheels. The landing gear provides a base for the helicopter 100 when on the ground, vertices of the base defined by points of contact between the landing gear and the ground. The helicopter 100 remains stable on the ground if the line of action of the weight of the helicopter 100 intersects the base. Skids form points of contact substantially parallel to the longitudinal axis of the helicopter 100. As such, the base is generally rectangular. Three or more wheels may be used for the landing gear. If three wheels are used, two may be disposed towards the rear and one towards the front of the helicopter 100. This provides a generally triangular base. A width of the base may be referred to as a track width or a track, and may be the maximum width of the base perpendicular to the longitudinal axis.

The fuselage 1000 has a generally elongate, streamlined and/or shark-like form. The helicopter 100 has a low drag coefficient in level forward flight, around 0.1 but at least less than around 0.2. This is in part provided by the fuselage 1000 and tail boom assembly 1200 defining a smooth continuous outer surface formed of flush-fitting composite such that, during flight, minimal or no protrusions extend from the fuselage 1000 or tail boom assembly 1200 into an airflow. The portion of the outer surface defined by the front 1024 of the fuselage 1000 is a substantially convex surface.

Towards the rear 1026 and bottom 1022 and on each of the left 1027 and right 1028 sides of the fuselage, the fuselage 1000 comprises a wheel fairing 1030. The wheel fairings 1030 project generally outwardly and downwardly from the rear 1026 of the fuselage 1000 and provide lateral stability for the helicopter 100 when in forward flight.

A pilot can provide cyclic and collective control inputs to control the helicopter 100 in flight. The main rotor assembly 2000 comprises rotor blades 2102 coupled to and configured to rotate with a central hub about an axis of rotation provided by a rotor mast extending from the top 1020 of the fuselage, the hub enclosed by a rotor hub fairing 2202. Each blade 2102 is configured to rotate at the root about its length so as to change its angle of attack. An upper swashplate and a lower swashplate are disposed about the mast and are arranged such that they collectively tilt and move up and down the mast. The upper swashplate rotates with the blades 2102 and has an upper control link coupled to each rotor blade 2102 to cause each rotor blade 2102 to twist about its length.

The lower swashplate is non-rotating and receives control input from the pilot's cyclic and collective controls, wherein a cyclic control input causes the lower swashplate to tilt and a collective control input causes the lower swashplate to move up or down the mast. Such tilting or movement is replicated in the upper swashplate, causing the angle of attack and therefore lift force generated by each blade 2102 to change. The tilt of the lower swashplate may also be described as a rotation of the lower swashplate about its lateral and longitudinal axes.

A cyclic input causes the swashplates to tilt, meaning the pitch of each blade 2102 varies as it rotates around the hub between a maximum at the azimuth corresponding to the highest point of the lower swashplate, and a minimum at the azimuth corresponding to the lowest point of the lower swashplate. By way of example, the pilot may provide a longitudinal cyclic input by moving a cyclic control towards the front (fwd) or the rear (aft) of the helicopter 100, thus tilting the swashplates causing the rotor blades 2102 to achieve a maximum lift when towards the rear or front respectively and a minimum lift when towards the front or rear respectively. This varies the fwd and aft movement of the helicopter 100 and induces a change in pitch of the front 1024 or nose of the helicopter 100 (downwards when moving fwd or forwards, upwards when moving aft or backwards). In forward flight, longitudinal cyclic control input can be used to adjust the forward speed and thus pitch of the helicopter 100. Similarly, a lateral cyclic input to the left 1027 or right 1028 tilts the swashplates laterally, causing the helicopter to move towards the left 1027 or right 1028. This induces roll, i.e. rotation about a longitudinal axis of the helicopter 100, to the left 1027 or right 1028.

A collective input provides a uniform change in pitch for all of the blades 2102, resulting in an overall change in lift for the helicopter 100. In a hover or level flight, an increased collective input therefore causes the helicopter 100 to climb vertically or upwards, and a decreased collective input causes the helicopter 100 to descend vertically or downwards. In pitched (forward) flight, a collective input can be used to vary the speed of the helicopter 100 without varying the pitch of the helicopter 100, but will induce an ascent or descent.

Further, anti-torque control input provided by the pilot, typically via left and right pedals, controls the angle of attack of tail rotor blades in the tail rotor assembly 1200. This varies the torque applied by a tail rotor 1250, so can be used to adjust the yaw or yaw rate (i.e. the bearing direction)

of the helicopter 100 in hover. In forward flight, an anti-torque control input varies the side-slip angle of the helicopter 100, i.e. the angle between the direction of travel and the heading of the helicopter 100. Cyclic, collective and anti-torque controls can be used in any combination to achieve a range of manoeuvres and flying conditions.

Figure 3A:
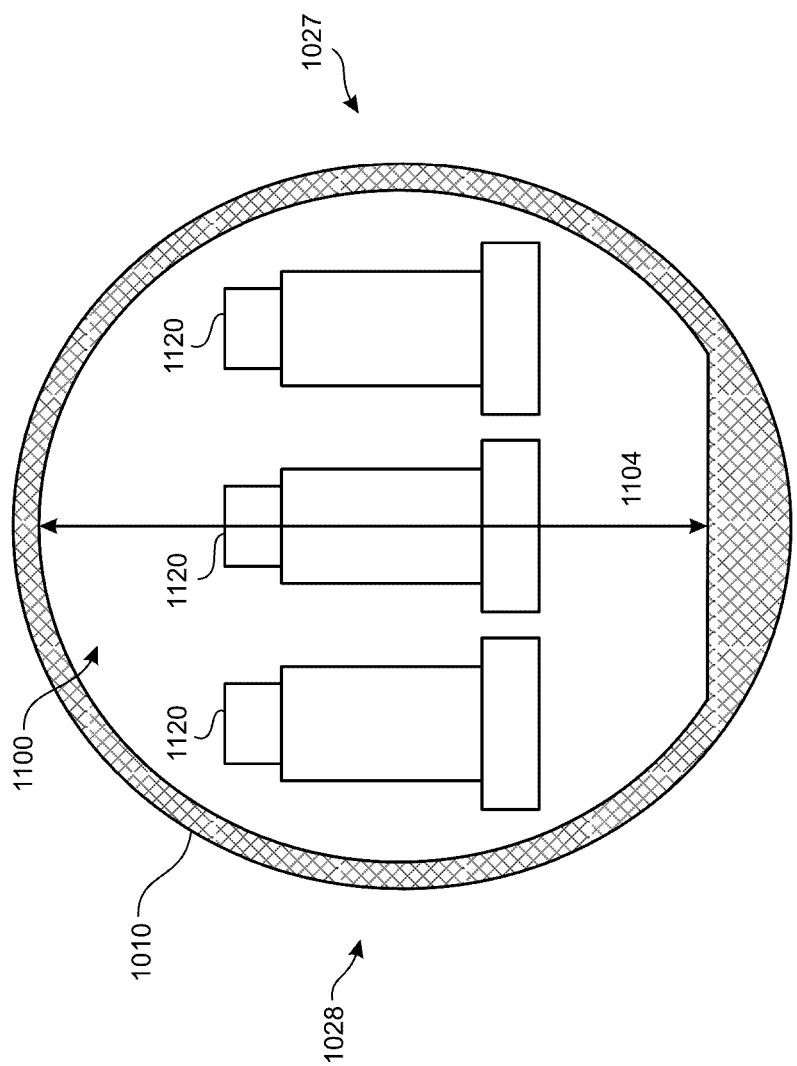
Figure 3B:
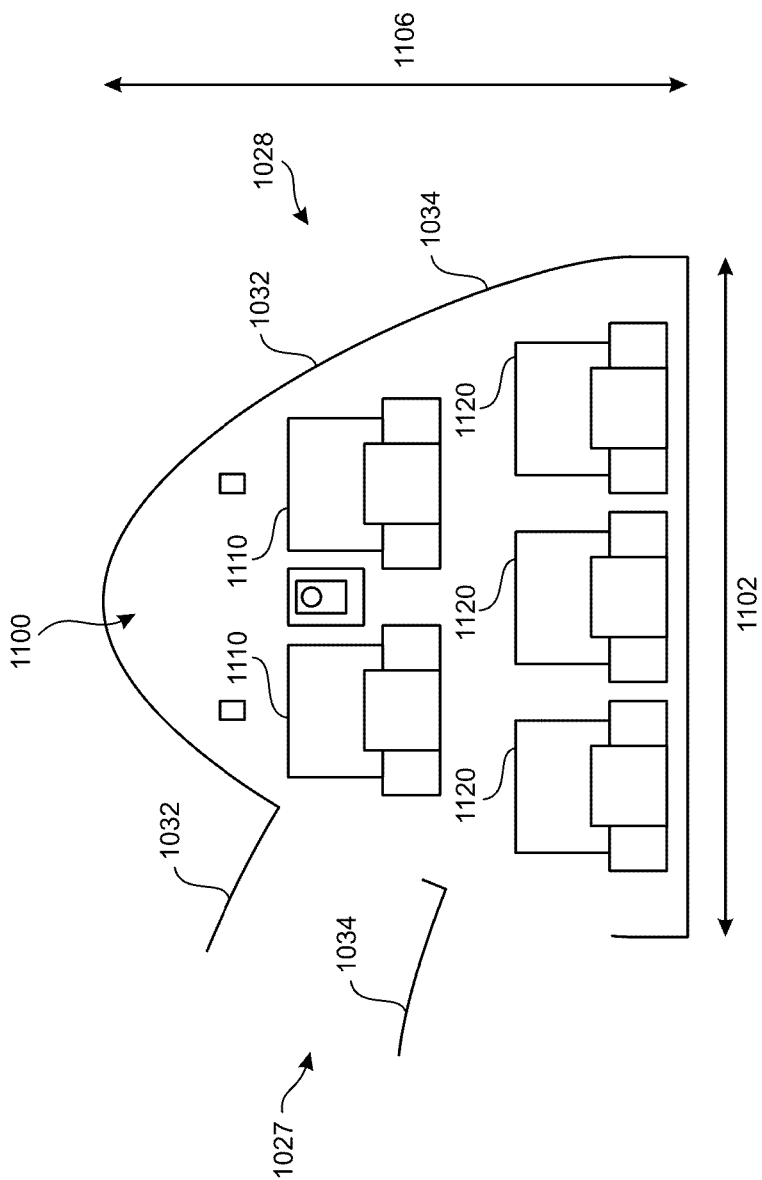

As shown in FIGS. 3a and 3b, within the fuselage 1000 exists a cabin 1100 providing a cavity for holding a pilot and any other occupants. The cabin 1100 has a maximum width 1102, a maximum height 1104 and a maximum length 1106. The cabin 1100 is arranged to hold 5 or fewer occupants, preferably arranged across 2 forward-facing front seating positions 1110 for the pilot and a co-pilot or passenger, and 3 forward-facing rear seating positions 1120 for additional passengers and/or cargo such as luggage. The cabin 1100 may further include an additional forward- or rear-facing rear seating position (not shown in the figures). The rear seating positions 1120 may include three or four individual seats, or a bench. The front seating positions 1110 are accessible via front doors 1032 and the rear seating positions 1120 are accessible via rear doors 1034. The front and rear doors 1032, 1034 when closed form a flush exterior surface homogeneous with the left 1027 and right 1028 surfaces of the fuselage 1000.

Within the rear 1026 of the fuselage 1000 behind the cabin 1100 exists a storage cavity 1040, for example to store luggage or other cargo during flight, and a fuel cavity 1050 adjacent the storage cavity 1040. In addition, there is a nose cavity 1060 in the front 1024 of the fuselage 1000 located at least partially forward of the front seating positions 1110.

As shown in FIGS. 1c and 1d, the fuselage 1000 has a maximum cross-section between a location C 2000 mm from the front 1024 of the fuselage 1000 and a location E 3000 mm from the front 1024 of the fuselage 1000. The maximum cross-section of the fuselage 1000 is around 3 m². This allows sufficient space for the cabin 1100 to hold up to 3 occupants in the rear seating positions 1120 comfortably in a seated position.

Stabilisers are fixed or adjustable aerodynamic surfaces such as wings or fins which are used to provide stability for the helicopter 100 in flight. For example, stabilising wings can extend in a transverse or lateral direction from the helicopter 100 and provide horizontal stability for the helicopter 100 by stabilising the pitch of the helicopter 100. Stabilisers extending in a vertical direction stabilise the yaw of the helicopter 100.

The tail boom assembly 1200 has a tail boom 1210, stabilising wings 1220 and a ducted tail rotor 1250. The tail rotor 1250 is configured to provide a thrust which creates a torque to counteract a torque produced by the main rotor assembly 2000. The tail boom 1210 has an internal cavity where a tail fuel tank may be placed. The wings 1220 take a generally aerofoil cross-section and extend outwardly from the tail boom 1210 first in a lateral direction and then in an oblique direction outwardly, downwardly and rearwardly. The wings 1210 provide horizontal stability in pitch and yaw for the helicopter 100 in forward flight. The tail boom assembly 1200 also includes a tail fin 1230 integrally formed with the tail boom 1210 and extending rearwardly beyond the tail rotor 1250 in a substantially vertical plane. When the helicopter 100 is in forward flight, the tail fin 1230 provides a lift which creates an additional torque about the centre of the helicopter 100 to counteract the torque produced by the main rotor assembly 2000. By extending beyond the tail rotor 1250, the torque produced by the tail fin 1230 is increased.

The helicopter 100 has an empty mass of around 850 kg. The maximum gross weight of the helicopter 100 is around 1650 kg internally, and 1850 kg externally. The helicopter 100 has an internal payload including fuel of 800 kg and an external payload including fuel of 1000 kg. "Internal" refers to the weight of components inside a helicopter, including passengers, fuel and the helicopter itself "External" refers to internal weight plus any external loads (excluding aerodynamic loads) such as cargo suspended below a helicopter during flight.

Figure 4A:
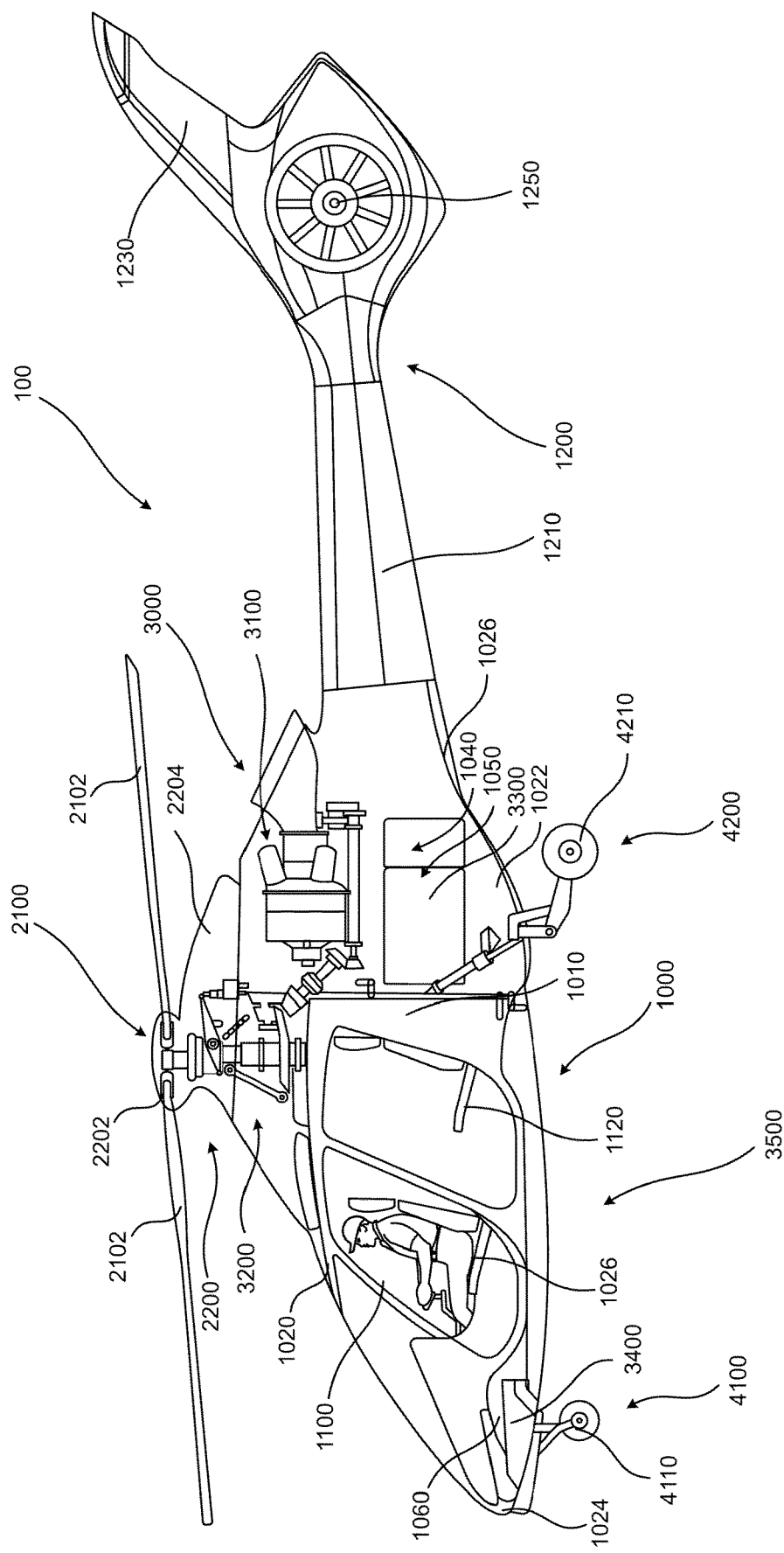
Figure 4B:
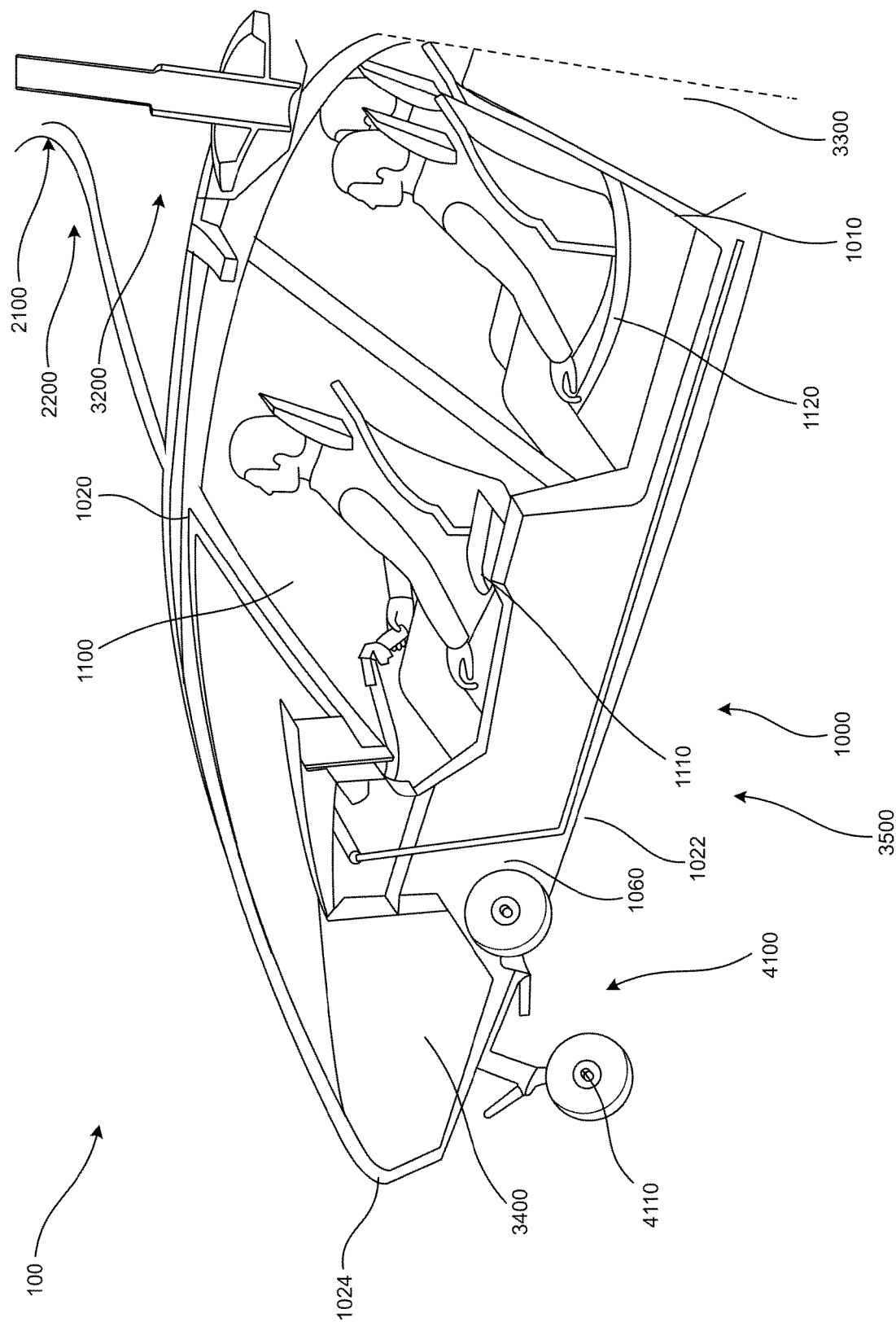
Figure 4C:
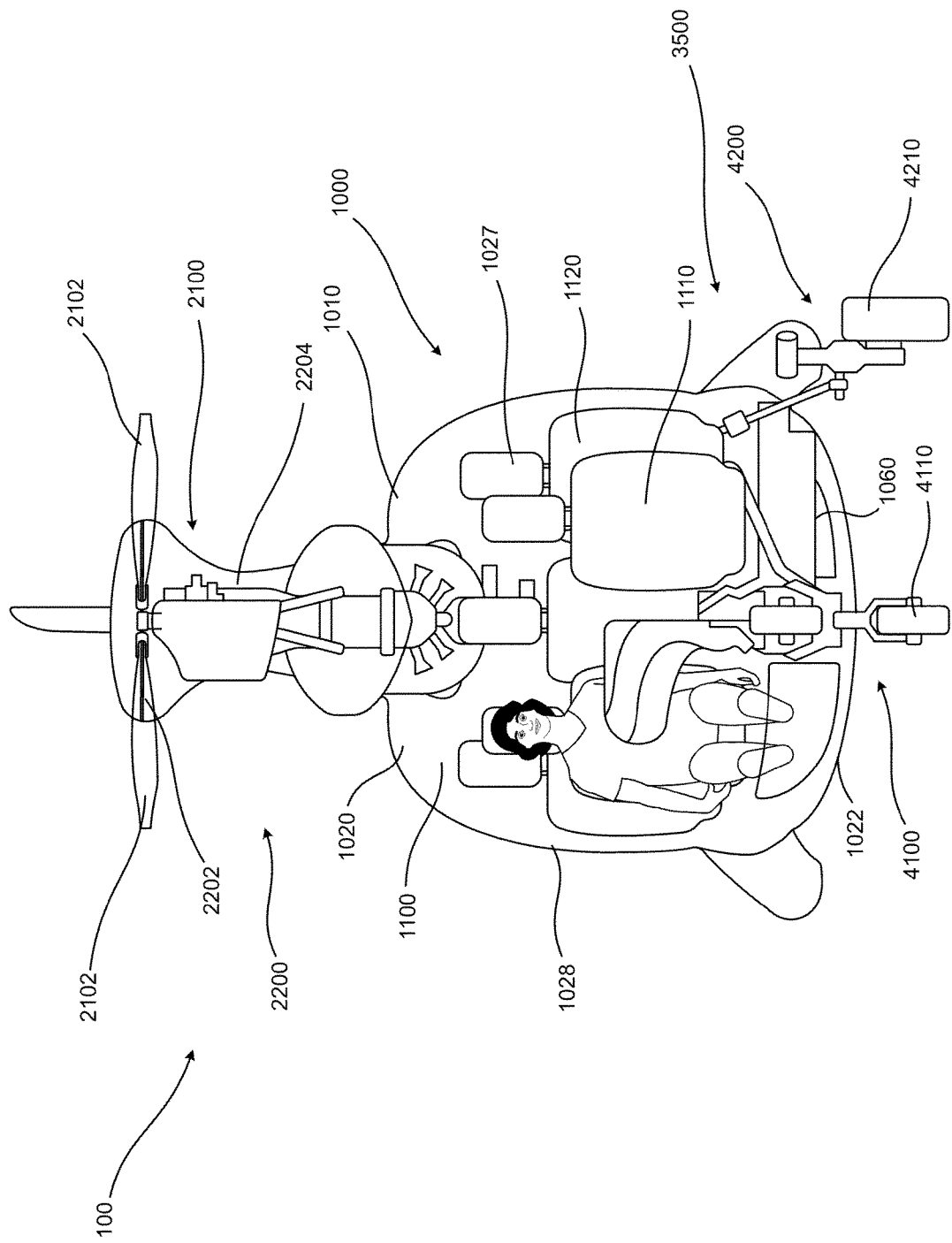

As shown in FIGS. 4a-c, the helicopter 100 includes a primary fuel cell 3300 disposed behind the cabin 1100 in the fuel cavity 1050. The primary fuel cell 3300 comprises one or more primary fuel tanks 3310 and one or more primary bladders 3320, where the one or more primary bladders 3320 line the fuel cavity 1050 and the one or more primary fuel tanks 3310 are mounted directly therein. The primary fuel cell 3300 has a maximum fuel capacity of around 660 litres.

A secondary fuel cell 3400, or trimmer tank, is disposed in the nose cavity 1060 substantially in front of and at least not directly beneath the front seating positions 1110 and is fluidly connected to the primary fuel cell 3300 and/or the engine 3100. The secondary fuel cell 3400 comprises one or more secondary fuel tanks 3410 and one or more secondary bladders 3420, where the one or more secondary bladders 3420 line the nose cavity 1060 and the one or more secondary fuel tanks 3410 are mounted directly therein. The secondary fuel cell 3400 has a maximum fuel capacity of around 76 litres.

The power plant 3000 has an engine 3100 which is rated to provide a maximum continuous power output of around 300 kW.

When the helicopter 100 is in a hover at 10,000 ft in an ISA+15° C., the tail rotor 1250 consumes between around 43 kW and 48 kW or between 13% and 17% of the power output from the engine 3100. In an ISA+15° C., the helicopter 100 has a hover out of ground effect (HOGE) ceiling of around 10,000 ft. In the same atmosphere the helicopter 100 has a hover in ground effect (HIGE) ceiling of more than around 10,000 ft.

When in forward flight and loaded with its maximum gross weight at 10,000 ft in an ISA+15° C., the helicopter 100 can achieve a maximum cruising speed of around 90 m/s an a $V_{ne}$ of around 102 m/s. At the maximum cruise speed of 90 m/s, the engine 3100 burns fuel at a rate of around 140 litres per hour.

When loaded with its maximum gross weight, the helicopter 100 is capable of climbing vertically at a rate of around 4.8 m/s at sea level in an ISA and at a rate of around 1.8 m/s at 10,000 ft in an ISA+15° C. When loaded with its maximum gross weight and travelling with a forward speed of around 40 m/s, the helicopter 100 is capable of climbing with a rate of 13 m/s.

The helicopter 100 has a maximum range of around 1250 km when travelling in forward flight in an ISA with 15° C. of variation at 10,000 ft with an occupant weight of 1650 kg and a take-off fuel volume of 650 litres at 72 m/s. The range of a flight including a standard take-off and landing procedure, the flight being predominantly at sea level in an ISA atmosphere with a combined occupant and luggage/cargo weight of 1650 kg, a take-off fuel volume of 400 litres and a cruising speed of 72 m/s, is around 770 km.

Centre of Mass Distribution

Referring to FIG. 4a the powerplant 3000 further comprises a longitudinal mass distribution apparatus 3500. Mass distribution may be critical in all types of aircraft, including helicopters 100.

For a helicopter 100, it is preferable for the centre of mass to be positioned as close as possible to a point directly below the rotor mast 2104. A helicopter 100 will have a centre of mass normal operating range in which the pilot has adequate control of the helicopter 100 as explained below. The range for the centre of mass is dependent on the design requirements of the helicopter 100. If the centre of mass is positioned away from the rotor mast 2104, which may act as a pivot point with the helicopter 100 body suspended below, then the helicopter 100 will tilt downwards at the position of the centre of mass. In order to counteract the tilt of the helicopter 100, and to return the helicopter 100 the operational position, known in the art as the trimmed position, the pilot must input cyclic control in the opposite direction to the tilt. For example, if the centre of mass shifts fwd, then the pilot must input rearward cyclic input to counteract the mass shift and vice versa. Similarly, if the centre of mass shifts to port during flight, then the pilot must input starboard cyclic input to counteract the mass shift and vice versa. Therefore, if the position of the centre of mass of the helicopter 100 varies then the pilot may be required to vary the amount of counteracting cyclic input. The safety and efficiency effects of the centre of mass operating range are mentioned below with respect to the longitudinal mass distribution method 3600.

Before take-off it is desirable for the helicopter 100 mass to be distributed appropriately. In other words, the centre of mass should be well within the normal operating range mentioned above. The centre of mass position before take-off may be affected by several factors, but, in particular, by different amounts, and positioning, of payload, i.e. passengers, luggage etc. For example, as in this embodiment, the helicopter 100 may comprise more than one seating position 1110, 1120 which may result in several different possible seating arrangements or combinations. If only a pilot is present in the front seating position 1110 then the centre of mass may shift forward, however, if several passengers are present in the rear seating position 1120 then the centre of mass may shift rearward.

The mass distribution may also shift during flight. By the end of a flight, particularly in long flights, the mass distribution may change significantly because the fuel is used up during flight. Depending on the position, both longitudinal and lateral position, of the fuel tank 3310, the helicopter 100 centre of mass may shift.

The longitudinal mass distribution apparatus 3500 as claimed aims to mitigate the mass distribution effects encountered before and during flight as mentioned above.

The longitudinal mass distribution apparatus 3500 comprises a primary fuel cell 3300 and a secondary fuel cell 3400. Fuel may be filled into the primary fuel cell 3300 while the helicopter 100 is parked and the secondary fuel cell 3400 may be filled via the primary fuel cell 3300. It is also possible for the fuel to be directly filled into the secondary fuel cell 3400, instead of, or as well as, via the primary fuel cell 3300 within the scope of the invention.

In this embodiment, the primary fuel cell 3300 is fluidly coupled to the engine 3100. In other words, there is a connection between the primary fuel cell 3300 and the engine 3100, but this connection may be provided via a fuel pump 3510 or other component.

In this embodiment, the secondary fuel cell 3400 is also fluidly coupled to the engine 3100. In other words, there is a connection between the secondary fuel cell 3400 and the engine 3100, but this connection may be provided via a fuel pump 3510 or other component. It is also possible for the secondary fuel cell 3400 to connect to the engine 3100 through, or via, the primary fuel cell 3300. In other words, the secondary fuel cell 3100 may be used to refill the primary fuel cell 3300.

In an alternative embodiment, the secondary fuel cell 3400 may be fluidly coupled to the engine 3100 but along a separate connection to the primary fuel cell 3300. In other words, the primary fuel cell 3300 and the secondary fuel cell 3400 provide distinctly separate sources for the engine 3100. However, in this alternative embodiment, the secondary fuel cell 3400 may need to be filled up separately to the primary fuel cell 3300.

In this embodiment, the primary fuel cell 3300 may be positioned in a fuel cavity 1050. The primary fuel cell 3300 may comprise one or more primary fuel tanks 3310 and one or more primary bladders 3320, in which the one or more primary bladders 3320 line the fuel cavity 1050 and the one or more primary fuel tanks 3310 are mounted directly therein.

In this embodiment, the secondary fuel cell 3400 is disposed in the nose cavity 1060. The secondary fuel cell 3400 comprises one or more secondary fuel tanks 3410 and one or more secondary bladders 3420, in which the one or more secondary bladders 3420 line the nose cavity 1060 and the one or more secondary fuel tanks 3410 are mounted directly therein.

Below the standard aeronautical terms aft and fwd are used. Aft meaning towards the rear of the helicopter 100 or away from the direction of forward travel. Fwd meaning towards the front of the helicopter 100 or towards the direction of forward travel.

The primary fuel cell 3300 centre of mass is positioned aft of the secondary fuel cell 3400 centre of mass. In other words, most of the primary fuel cell 3300 is positioned behind the secondary fuel cell 3400 with respect to the longitudinal direction. By positioning the primary fuel cell 3300 and the secondary fuel cell 3400 in different longitudinal positions this gives the ability to vary the longitudinal mass distribution depending on the volumetric usage of each of the fuel cells 3300, 3400.

The primary fuel cell 3300, as the name suggests, is likely to be the principal fuel supply for the engine 3100. Therefore, it is likely that the fuel reserves required for the flight, are stored primarily, or solely, in the primary fuel cell 3300. The secondary fuel cell 3400 may only be used for mass distribution purposes, and the secondary fuel reserves are not used. However, it is preferable that the secondary fuel reserves in the secondary fuel cell 3400 are used as part of the overall fuel reserves for the flight as this may reduce the overall fuel mass requirement. In other words, the secondary fuel cell 3400 may provide additional capacity for the overall fuel reserves and may not solely be used for mass distribution purposes.

It is preferable that a passenger cabin 1100 centre of mass is positioned fwd of the rotor mast 2104. In other words, most of the passenger cabin 1100 is positioned in front of the rotor mast 2104. By positioning the passengers in front of the rotor mast 2104 and surrounding rotor control assembly 2100, the passengers are less likely to be affected by the rotor 2100 noise. In this embodiment, the passenger cabin 1100 comprises a front seating position 1110 and a rear seating position 1120. In more detail, the front seating position 1110 comprises one pilot seat and one passenger seat, and the rear seating position 1120 comprises three passenger seats. In this embodiment, the rear seating position 1120 is positioned partly under the rotor mast 2104, however, the centre of mass of the passenger cabin 1100 is still in front of the rotor mast 2104.

It is preferable that the primary fuel cell 3300 centre of mass is positioned aft of the rotor mast 2104. In other words, most of the primary fuel cell 3300 is positioned behind the rotor mast 2104. By positioning the primary fuel cell 3300 behind the rotor mast 2104, and therefore behind the passenger cabin 1100, the primary fuel 3300 may act as ballast to counteract the mass of the passenger cabin 1100. It is also common for the engine 3100 to be positioned near to the rotor control assembly 2100 to reduce the transmission distance, and behind the passenger cabin 1100 to reduce the cabin noise. Therefore, the engine 3100 may also act as ballast to counteract the mass of the passenger cabin 1100.

By positioning the primary fuel cell 3300, and the engine 3100, behind the rotor mast 2104 it may require the passenger cabin 1100 to mainly provide the forward ballast. As mentioned above, the mass of the passenger cabin 1100 may vary depending on the number of passengers onboard before take-off. To maintain an overall centre of mass for the helicopter 100 that is within the normal operating limits it is preferable that the secondary fuel cell 3400 centre of mass is positioned forward of the rotor mast 2104. In other words, most of the secondary fuel cell 3400 is positioned in front of the rotor mast 2104. By positioning the secondary fuel cell 3400 in front of the rotor mast 2104 the secondary fuel cell 3400 may counteract any changes in the mass of the passenger cabin 1100.

In this embodiment, the secondary fuel cell 3400 centre of mass is positioned forward of the passenger cabin 1100 centre of mass. In other words, most of the secondary fuel cell 3400 is positioned in front of most of the passenger cabin 1100. By positioning the secondary fuel cell 3400 in front of the passenger cabin 1100, instead of simply in front of the rotor mast 2104, the centre of mass of the secondary fuel cell 3400 is shifted further forward. By shifting the secondary fuel cell 3400 centre of mass further forward, the effect of changing the mass of the secondary fuel cell 3400 on the overall centre of mass of the helicopter 100 is greater. In other words, the secondary fuel cell 3400 is more effective at shifting the mass distribution when positioned further forward. Therefore, the amount of fuel required in the secondary fuel cell 3400 to provide the required mass distribution may be reduced, which may result in a reduction in the overall mass of the helicopter 100.

In this particular embodiment, the secondary fuel cell 3400 is positioned in the nose of the helicopter 100, below the level of the front and rear seating positions 1110, 1120, as shown in FIGS. 4b and 4c.

Figure 4D:
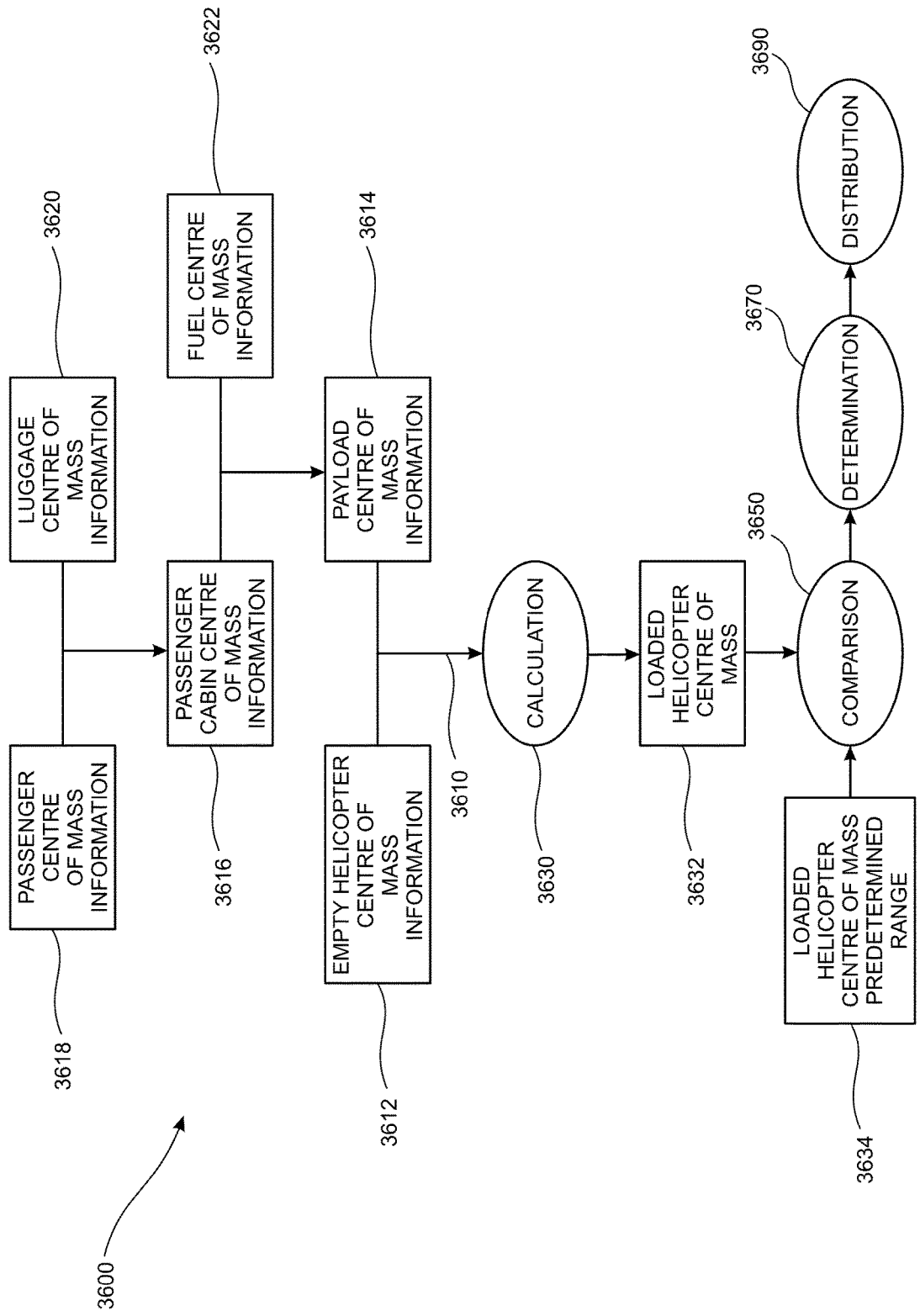

Referring to FIG. 4d, there is provided a longitudinal mass distribution method 3600. The method comprises inputting empty helicopter centre of mass information 3612 and payload centre of mass information 3614, calculating 3630 the loaded helicopter centre of mass 3632, comparing 3650 the loaded helicopter centre of mass 3632 with a predetermined loaded helicopter centre of mass range 3634, determining 3670 if the loaded helicopter centre of mass 3632 is within the predetermined loaded helicopter centre of mass range 3634, distributing 3690 fuel from a primary fuel cell 3300 to a secondary fuel cell 3400, in which the distribution 3690 is dependent on the comparison 3650 between the calculated loaded helicopter centre of mass 3632 and the predetermined loaded helicopter centre of mass range 3634.

It is preferable that the empty helicopter centre of mass information 3612 and the predetermined loaded helicopter centre of mass range 3634 are known for the specific helicopter 100 in use. In this embodiment, the helicopter 100 is the HX50 Hill Helicopter 100.

The predetermined loaded helicopter centre of mass range 3634 is defined as a safety and/or efficiency range that has been calculated by theory or measured by testing. In other words, the range is the normal operating range for the helicopter 100 in use based on the safety and efficiency implications of shifting the mass distribution. Regarding safety, a large centre of mass shift may require significant pilot cyclic input to counteract, which could exceed loading limits on some components or cause an increase in blade 2102 angle of attack which may cause blade 2102 stalling. Regarding efficiency, the increase in blade 2102 angle of attack may increase the profile drag of the blades 2102 and reduce the efficiency.

By comparing 3650 the loaded helicopter centre of mass 3632 with a predetermined loaded helicopter centre of mass range 3634 this enables the mass distribution computing device 3700, mentioned below, to determine 3670 if the loaded helicopter centre of mass 3632 is within the predetermined loaded helicopter centre of mass range 3634. If the loaded helicopter centre of mass 3632 is not within the predetermined loaded helicopter centre of mass range 3634 then a distribution 3690 is required. However, if the loaded helicopter centre of mass 3632 is within the predetermined loaded helicopter centre of mass range 3634 then there may be no need to distribute 3690 the fuel. Although, it may be suitable to distribute the fuel within the predetermined loaded helicopter centre of mass range 3634 to a more optimal position.

By distributing 3690 fuel from a primary fuel cell 3300 to a secondary fuel cell 3400 this enables the loaded helicopter centre of mass 3632 to be shifted towards the predetermined loaded helicopter centre of mass range 3634.

In this embodiment, the amount of fuel distributed 3690 from the primary fuel cell 3300 to the secondary fuel cell 3400 is dependent on the variation between the loaded helicopter centre of mass 3632 and the predetermined loaded helicopter centre of mass range 3634. In other words, the further the loaded helicopter centre of mass 3632 is from the predetermined loaded helicopter centre of mass range 3634 then the more fuel is distributed 3690 to get closer to the predetermined loaded helicopter centre of mass range 3634.

In this embodiment, the amount of fuel distributed 3690 from the primary fuel cell 3300 to the secondary fuel cell 3400 is sufficient to shift the loaded helicopter centre of mass 3632 into the predetermined loaded helicopter centre of mass range 3634. In other words, the distribution 3690 of fuel aims to return the helicopter centre of mass 3632 to the predetermined loaded helicopter centre of mass range 3634.

It is preferable that any centre of mass information comprises mass and longitudinal position. By knowing the mass and the longitudinal position of each component, the individual contribution to the mass distribution may be accounted for in the loaded helicopter centre of mass 3632.

It is preferable that the payload centre of mass information 3614 further comprises loaded passenger cabin centre of mass information 3616 and fuel centre of mass information 3622. By knowing the fuel centre of mass information 3622 the individual contribution of the fuel, which varies during flight, may be accounted for loaded helicopter centre of mass 3632.

It is preferable that the loaded passenger cabin centre of mass information 3616 comprises at least one passenger centre of mass information 3618 and luggage centre of mass information 3620. By knowing each/the passenger centre of mass information 3618 the individual contribution of the passenger, which may be varied between flights, may be accounted for loaded helicopter centre of mass 3632.

The longitudinal mass distribution method 3600 may be carried out before flight or during flight. If the method is carried out before flight, then it may be carried out manually by calculating the take-off loaded helicopter centre of mass 3632 and manually distributing 3690 the fuel between the primary fuel cell 3300 and the secondary fuel cell 3400. If the method is carried out during flight, then it may be carried out by a mass distribution computing device 3700, as mentioned below. The mass distribution computing device 3700 may also be used before flight.

Figure 4E:
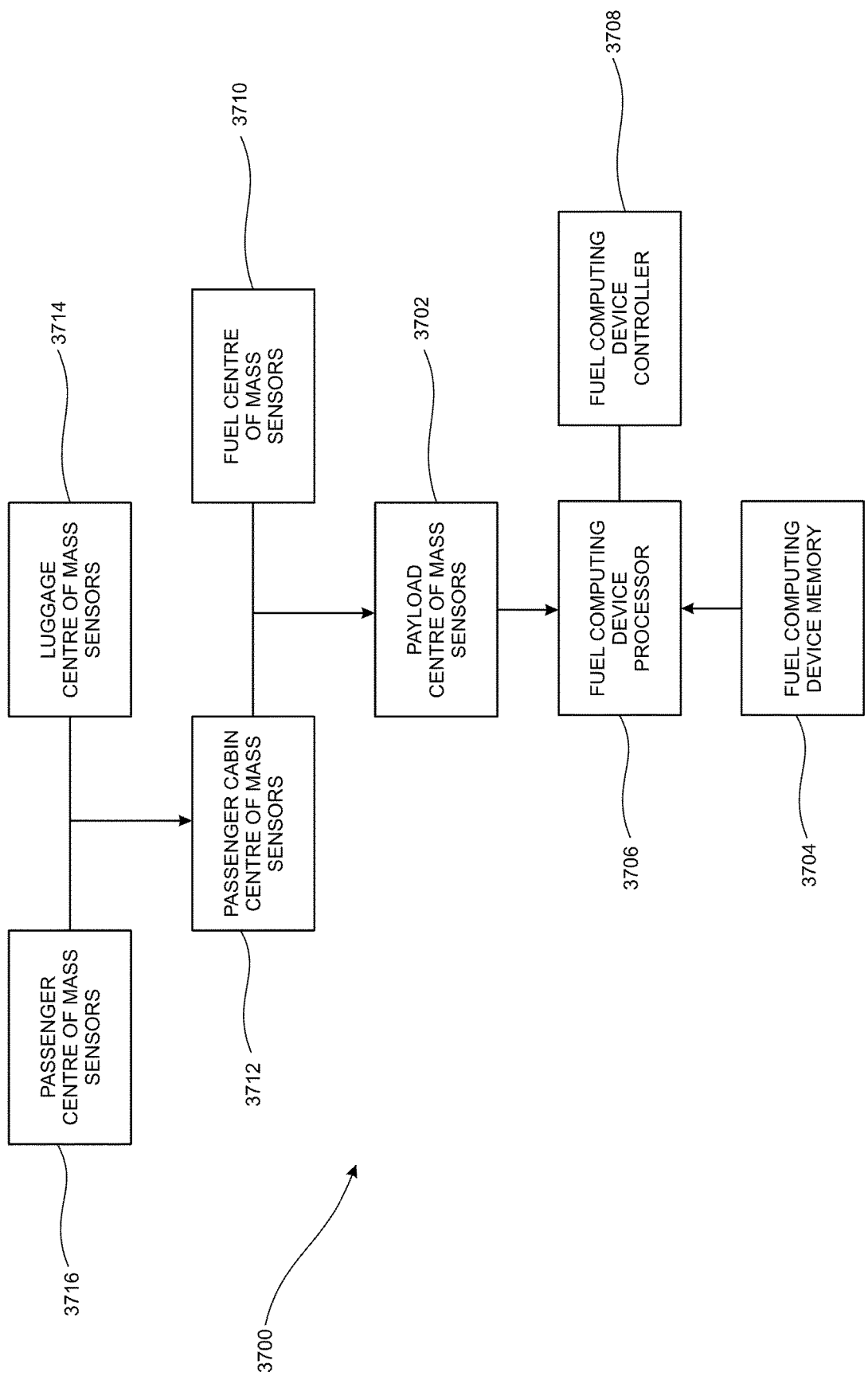

Referring to FIG. 4e, it is preferable that the longitudinal mass distribution method 3600 is carried out on a mass distribution computing device 3700, before and during flight.

It is also preferable that the known empty helicopter centre of mass information 3612 and the predetermined loaded helicopter centre of mass range 3634 are stored by a mass distribution computing device memory 3704. It is also preferable that the payload centre of mass information 3614 is either inputted 3610 manually by the pilot or it is provided by payload centre of mass sensors 3702 on the helicopter 100. It may only be possible to input 3610 the payload centre of mass information 3614 manually before take-off. Inputting 3610 the payload centre of mass information 3614 automatically from the payload centre of mass sensors 3702 may be carried out before take-off or during flight.

In this embodiment, the payload centre of mass sensors 3702 further comprise fuel centre of mass sensors 3710 and passenger cabin centre of mass sensors 3712. The fuel centre of mass sensors 3710 are positioned in both the first fuel cell 3300 and the second fuel cell 3400. The fuel centre of mass sensors 3710 can enable to fuel level to be tracked during flight. In this embodiment, the passenger cabin centre of mass sensors 3712 further comprises luggage centre of mass sensors 3714 and passenger centre of mass sensors 3716. The luggage centre of mass sensors 3714 are positioned in the luggage hold. The passenger centre of mass sensors 3716 are positioned in both the front seating position 1110 and the second seating position 1120.

It is also preferable that the calculation 3630 of the loaded helicopter centre of mass 3632 is carried out by a mass distribution computing device processor 3706.

It is also preferable that the comparison 3650 of the loaded helicopter centre of mass 3634 with a predetermined loaded helicopter centre of mass range 3632 is carried out by the mass distribution computing device processor 3706.

It is also preferable that the determination 3670 of whether the loaded helicopter centre of mass 3632 is within the predetermined loaded helicopter centre of mass range 3634 is carried out by the mass distribution computing device processor 3706.

It is also preferable that the distribution 3650 of fuel is regulated by a mass distribution controller 3708 and carried out by a fuel pump 3510 on the helicopter 100 before take-off and during flight. However, it is also possible for the distribution 3650 of fuel to be carried out manually before take-off.

In embodiments, the primary and secondary fuel cells are arranged so that the centre of mass of the helicopter remains within longitudinal centre of mass limits over a range of fuel consumption of at least 400 litres when lightly loaded (for example with a single pilot of 85 kg or less) and when loaded with 4 passengers.

In the case where fuel cells are irregular and the centre of mass moves materially during fuel usage with respect to the sensitivity of the aircraft balance to the centre of mass position, references to the centre of mass should be taken as the centre of mass when half full.

Landing Gear

Referring to FIGS. 5a to 5d, an example landing gear arrangement 4000 for the helicopter 100 will now be described. The landing gear arrangement 4000 is retractable into the bottom 1022 of the fuselage 1000 and comprises at least one nose wheel assembly 4100 and a plurality of main wheel assemblies 4200. The landing gear arrangement 4000 has a stowed configuration and a deployed configuration, and is arranged to move between the configurations in response to receiving a landing gear control input. The landing gear arrangement 4000 has shock-absorbing capabilities and, when in the deployed configuration, can support the helicopter 100 from a ground surface and preferably reliably withstand a landing contact with a vertical velocity of 2 m/s and/or loads of up to 3 times the weight of the helicopter 100 without permanently deforming. This allows the helicopter 100 to perform hurried or emergency landings without injuring or causing discomfort to any occupants.

Figure 5A:
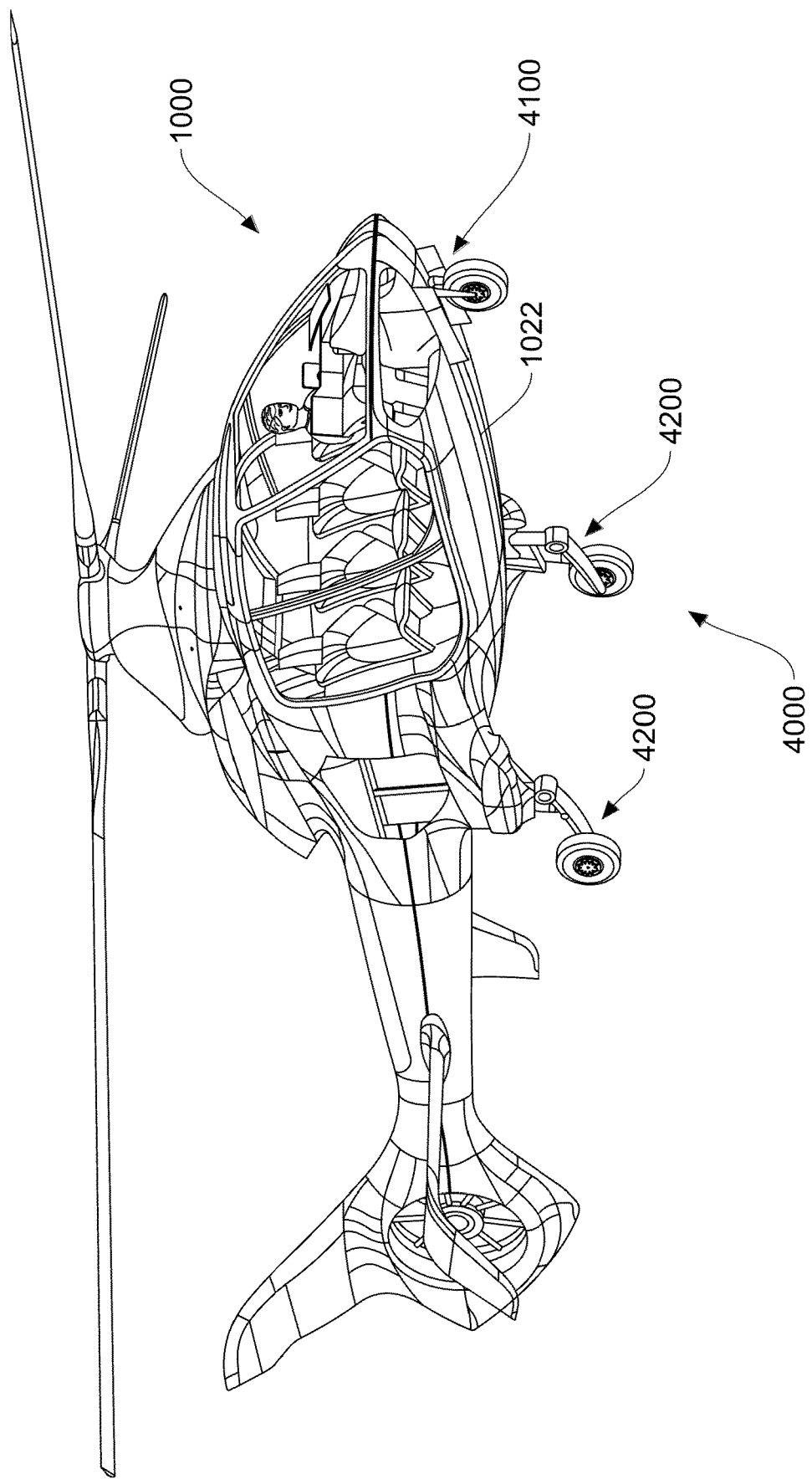
FIGS. 5a and 5b show respectively a perspective view and a front view of the helicopter of FIG. 1a with retractable landing gear deployed.
Figure 5B:
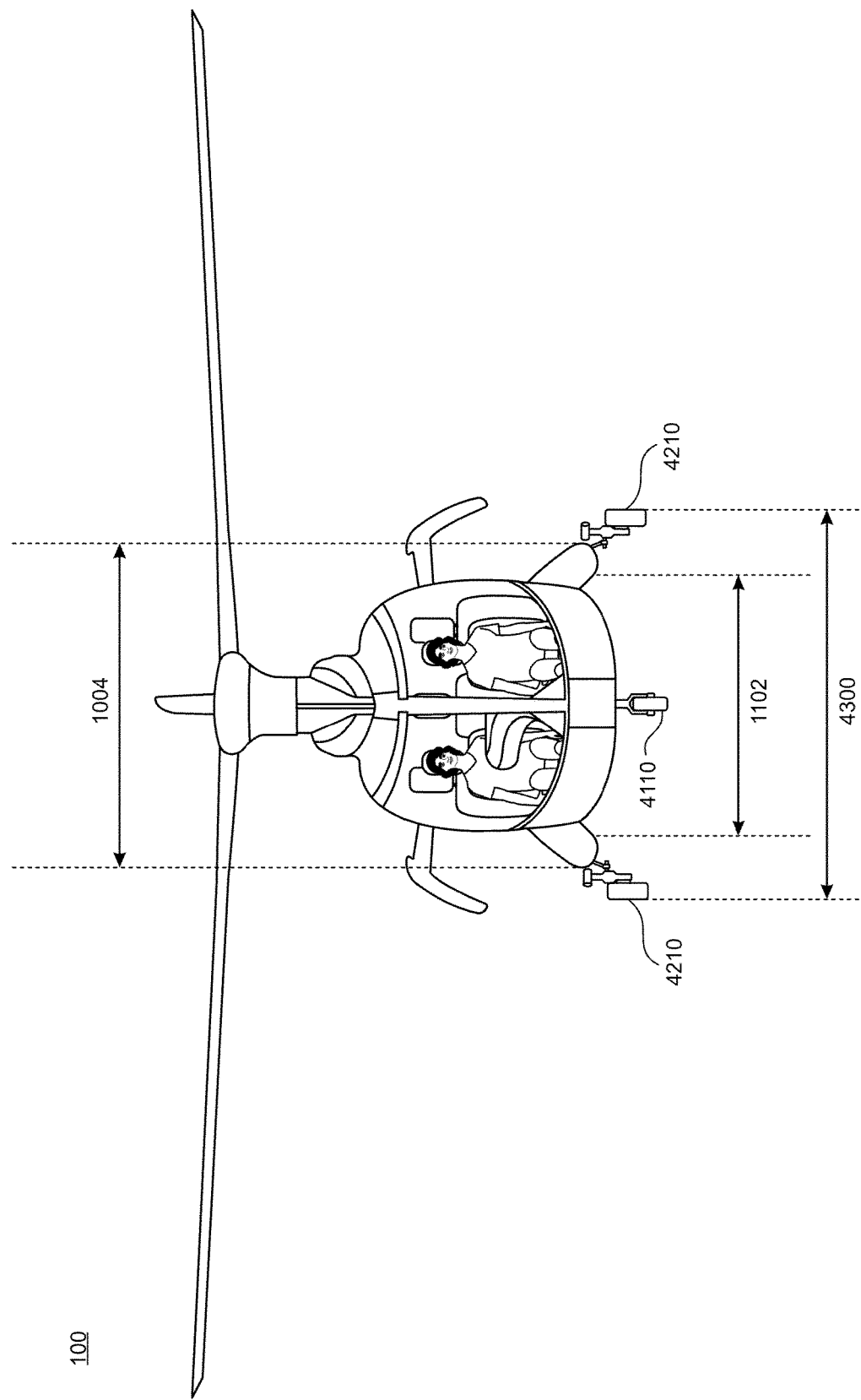
Figure 5C:
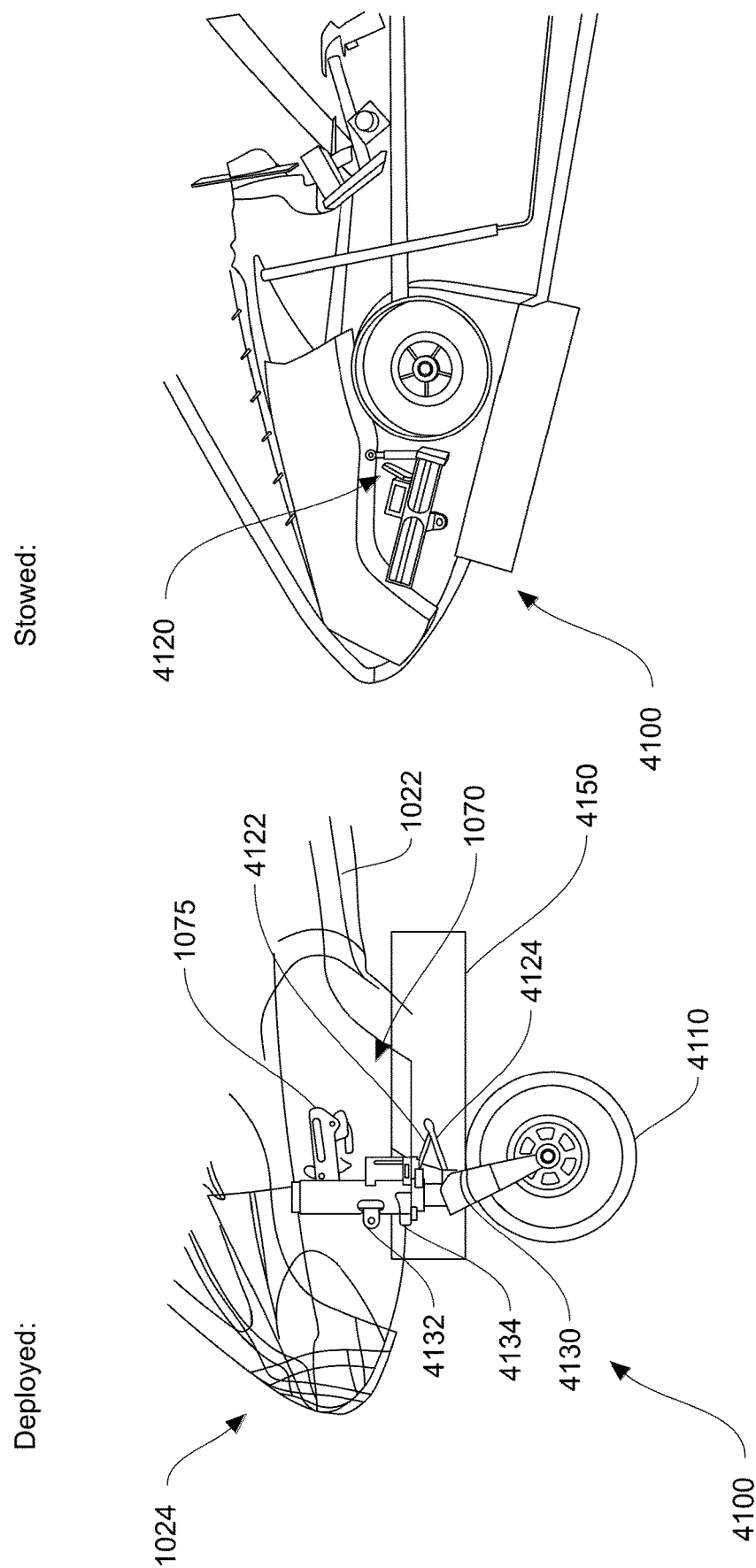
FIG. 5c shows a side view of the nose landing gear of FIGS. 5a and 5b in stowed and deployed configurations.

As shown in FIG. 5c, the nose wheel assembly 4100 is retractable into a nose wheel cavity 1070 located adjacent the bottom 1022 and towards the front 1024 of the fuselage 1000. The assembly 4100 includes a nose wheel 4110, an elongate forked leg member 4130 arranged to hold the nose wheel 4110, and a mechanical linkage 4120 attached to the leg member 4130 and formed of first and second links 4122, 4124. The leg member 4130 is attached via a pivot 4132 to a surface in the nose wheel cavity 1070. The nose wheel 4110 is coupled to the forked leg member 4130 such that the wheel 4110 is freely rotatable about an axle. The forked leg member 4130 comprises a dashpot and a spring configured to provide shock-absorbing capability for forces applied along the length of the leg member 4130.

An actuator 4140 is coupled to the leg member 4130 and to a surface in the nose wheel cavity 1070. The actuator 4140 is arranged to vary the nose wheel assembly 4100 between the stowed configuration and the deployed configuration upon receipt of a control input. In this example, the actuator 4140 is arranged to receive an electrical control signal to mechanically extend or to retract. In response to receiving such a control signal, the actuator 4140 extends or retracts causing the nose wheel assembly 4100 to adopt the deployed configuration or the stowed configuration correspondingly.

In the stowed configuration, the nose wheel assembly 4100 is stored in the nose wheel cavity 1070 such that the leg member 4130 is oriented with its length substantially parallel to a plane of the bottom 1022 of the fuselage 1000, and a front latch mechanism 1075 engages with a lug 4134 disposed on the leg member 4130 to secure the assembly 4100 inside the cavity 1070.

Doors 4150 are hingedly attached to the bottom 1022 of the fuselage 1000 and, when the landing gear arrangement 4000 is in the stowed configuration, are closed to conceal the cavity 1070 externally of the helicopter 100 and form an exterior surface flush with the bottom 1022 of the fuselage 1000. In the deployed configuration, the doors 4150 are open and provide an aperture through which the nose wheel assembly 4100 projects from the nose wheel cavity 1070 downwardly of the bottom 1022 of the fuselage 1000. In other examples, a single door may be used, or one or more panels may be configured to slide back and forth in order to expose and conceal the cavity 1070.

Figure 5D:
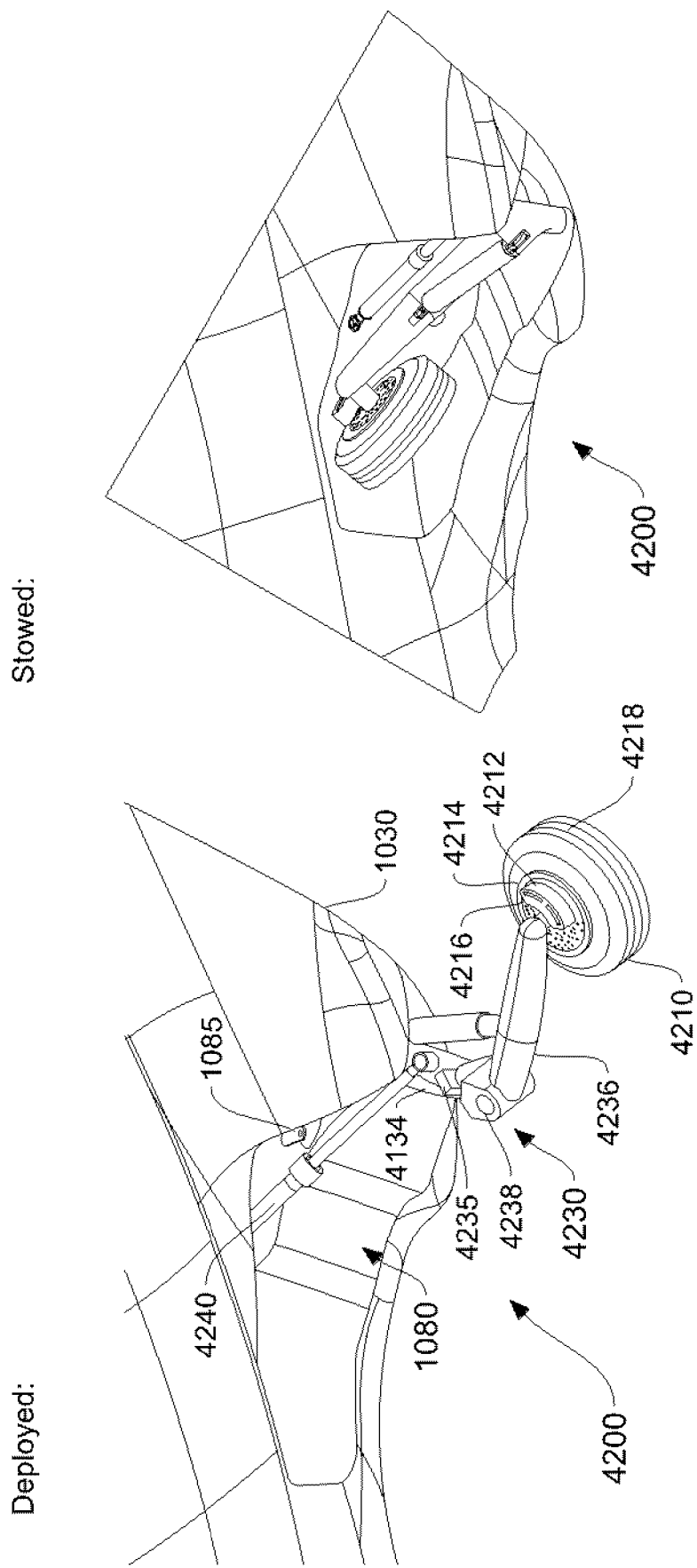
FIG. 5d shows a perspective view of the main landing gear of FIGS. 5a and 5b in stowed and deployed configurations.

As shown in FIG. 5d, the main wheel assemblies 4200 are retractable into main wheel cavities 1080 located in the wheel fairings 1030. Each main wheel assembly 4200 comprises a main wheel 4210 and a jointed leg 4230 arranged to hold the main wheel 4210. The leg 4230 is attached via a pivot 4232 to a surface in the main wheel cavity 1080 and comprises an upper member 4234 and lower member 4236 pivotally connected at a knee joint 4238. The main wheel 4210 is coupled to a stub axle disposed at a distal end of the lower member 4236 such that the wheel 4210 is rotatable about an outer-facing stub axle. The wheel 4210 comprises a hub 4212, an electric motor 4214 mounted to the hub 4212, and a brake 4216 mounted to the hub 4212. Wiring for the electric motor 4214 and the brake 4216 is housed within a conduit formed through the upper 4234 and lower 4236 members and is configured to provide power and control signals to the motor 4214 and brake 4216. The electric motors 4214 in each main wheel assembly 4200 are independently controllable, allowing the helicopter to achieve ground navigation using differential steering. The assembly 4200 includes a shock-absorber pivotally connected to the upper and lower members 4234, 4236, the shock-absorber comprising a dashpot and a spring. The shock-absorber provides shock-absorbing capability against forces applied substantially normal to a ground surface of which the helicopter 100 rests.

An actuator 4240 is coupled to the upper member 4234 and to a surface in the main wheel cavity 1080. The actuator 4240 is arranged to vary the main wheel assembly 4200 between the stowed configuration and the deployed configuration upon receipt of a control input. In this example, the actuator 4240 is arranged to receive an electrical control signal to mechanically extend or to retract. In response to receiving such a control signal, the actuator 4240 extends or retracts causing the main wheel assembly 4200 to adopt the deployed configuration or the stowed configuration correspondingly.

In the stowed configuration, the main wheel assembly 4200 is stored in the main wheel cavity 1080 such that a rear latch mechanism 1085 engages with a lug 4235 disposed on the leg member 4230 to secure the assembly 4200 inside the cavity 1080.

A portion of the wheel fairing 1030 is hinged and, when the landing gear arrangement 4000 is in the stowed configuration, is closed to conceal the cavity 1080 externally of the helicopter 100 and form an exterior surface flush with the rest of the wheel fairing 1030.

In the deployed configuration, the hinged portion of the wheel fairing 1030 opens and provides an aperture through which the main wheel assembly 4200 projects from the main wheel cavity 1080 downwardly of the bottom 1022 of the fuselage 1000 and outwardly of the width of the fuselage 1000. When deployed, the main wheels 4210 define a track width 4300 as the distance between their points of contact with the ground surface. The track width 4300 is wider than the maximum cabin width 1102, providing increased stability over wheels which project directly downward from a rotorcraft's fuselage.

In some examples, the nose wheel assembly 4100 comprises a skid plate attached to the axle, wherein the skid plate extends in front, around and behind the nose wheel 4110 substantially in a plane intersecting the wheel 4110 and parallel to the bottom 1022 of the fuselage 1000. Similarly, each of the main wheel assemblies 4200 comprises a skid plate attached to the leg 4230. The skid plates each have a width at least twice a width of the respective wheels 4110, 4210 and have front and rear ends angled upwards towards the fuselage 1000 preferably in a curved or flared manner. The skid plates allow the helicopter 100 to land on and take off from soft ground surfaces such as snow or mud by providing a greater contact surface area to avoid sinking.

In some examples, the landing gear arrangement 4000 comprises skids extending along at least a portion of and substantially parallel to the fuselage length 1002 on each side of the fuselage 1000. Each skid comprises struts attached to the front 1024 and rear 1026 of the fuselage 1000. The struts extend downwardly and outwardly from the fuselage 1000 and are connected to an elongate skid base. The skid bases define a track width 4300 as the shortest distance between their points of contact with the ground surface. In some examples, the skid bases are tubular and hollow. In some examples, the skid bases have a flat underside, for example they may take the form of skis. In some examples, the landing gear arrangement 4000 includes fairings to provide aerodynamic bodies for covering the skids from oncoming airflows.

In examples where the helicopter 100 has a landing gear arrangement 4000 comprising skids, the rotor control assembly 2100 includes at least 3 blades 2102 and is fully articulated.

Rotor Hub and Engine

Figure 6:
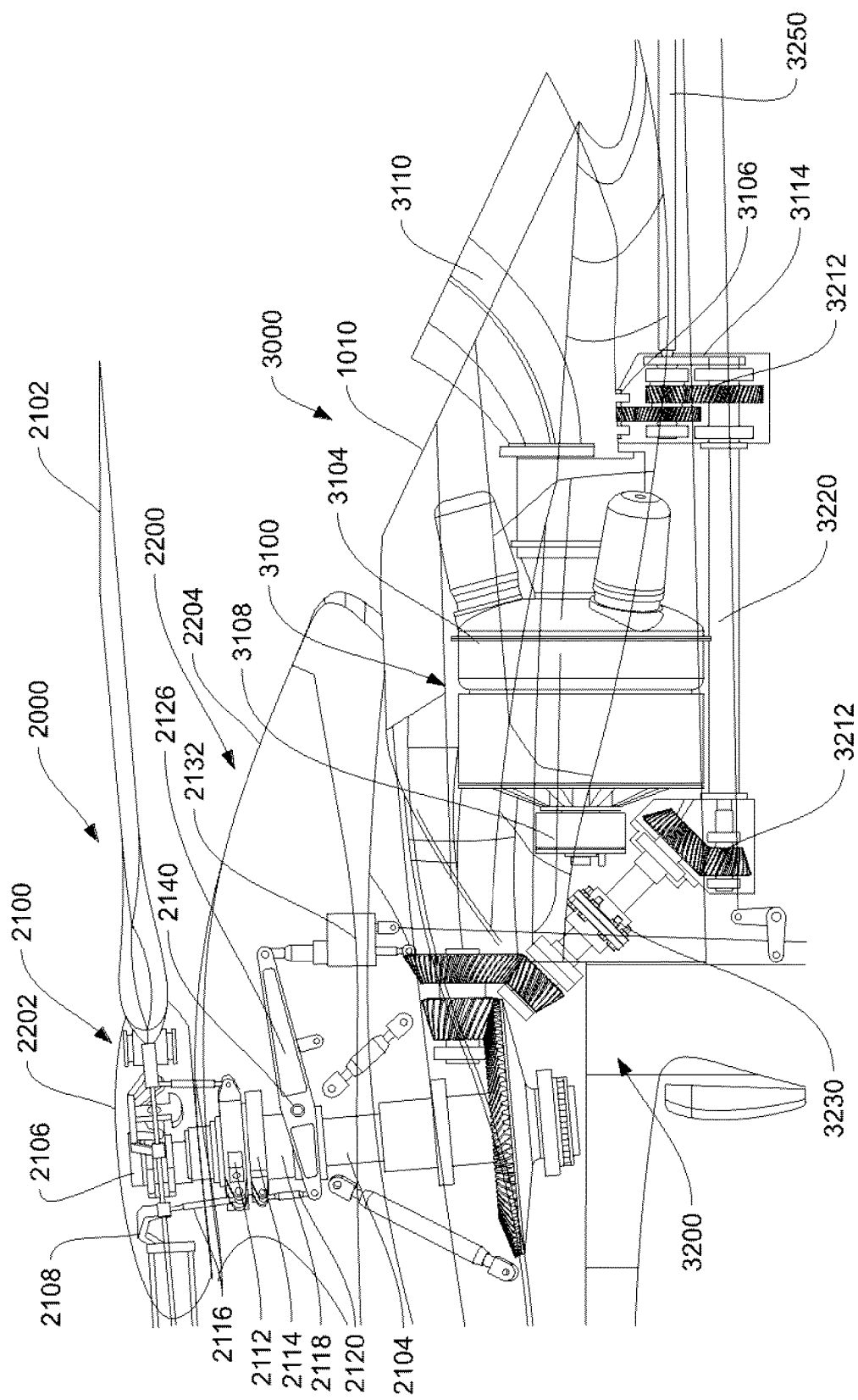
FIG. 6 shows a side view of an example power plant and main rotor assembly for a helicopter.
Figure 7A:
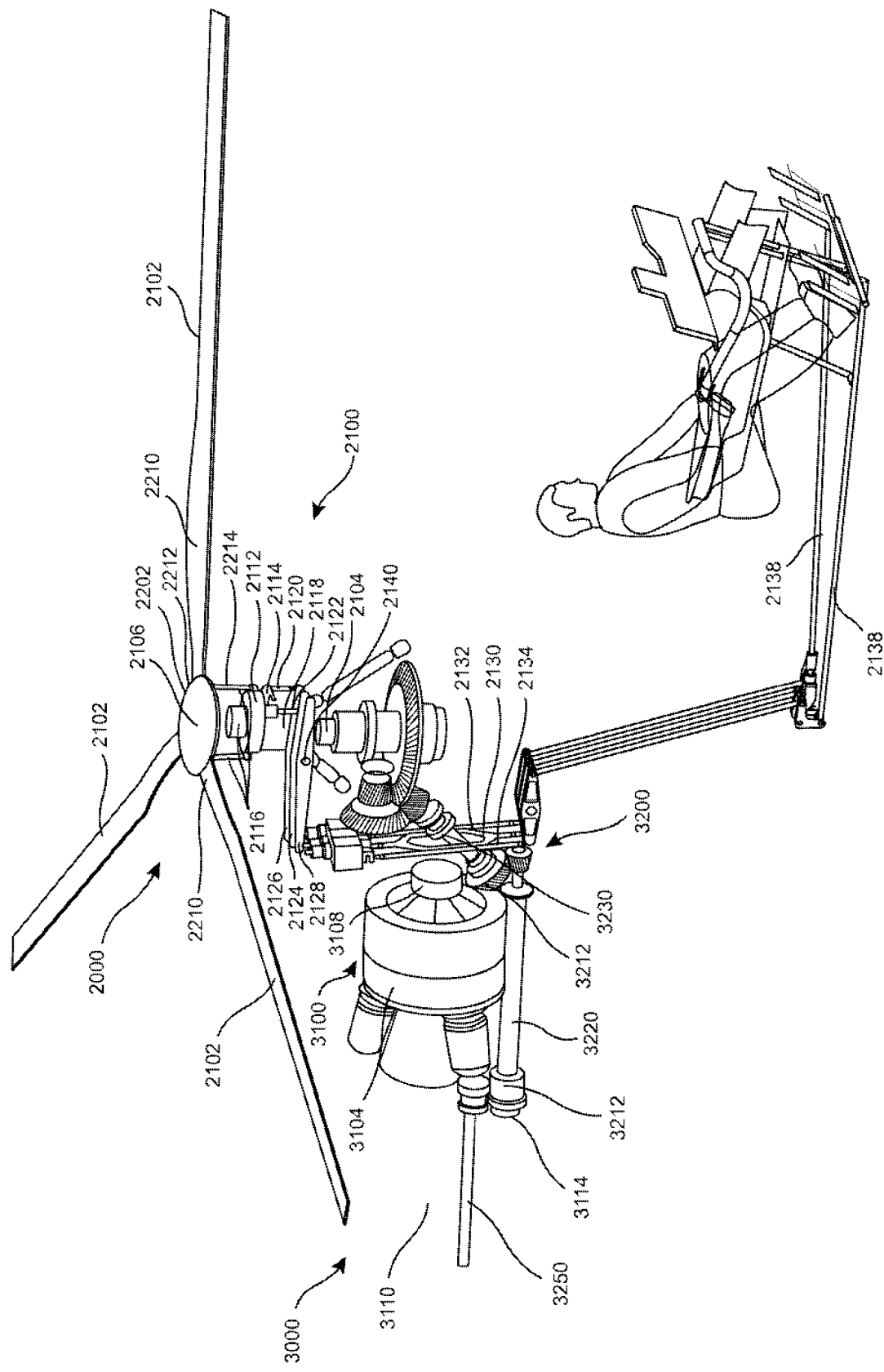
FIG. 7a shows a perspective schematic diagram of the power plant and main rotor assembly of FIG. 6.
Figure 7B:
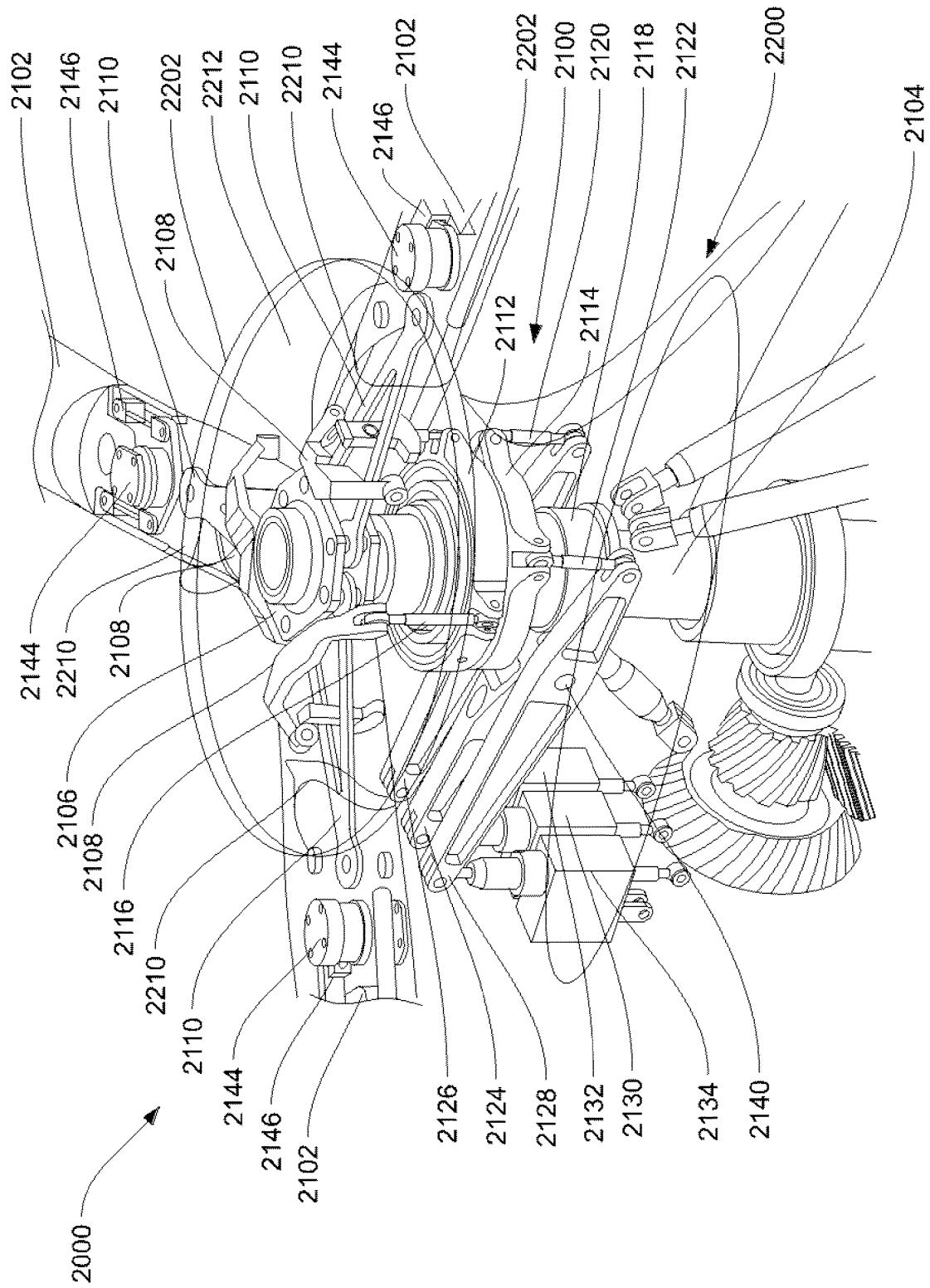
FIG. 7b shows a perspective schematic diagram of the main rotor assembly of FIG. 6.

Referring to FIGS. 6, 7a and 7b, an example power plant 3000 and main rotor assembly 2000 will now be described. The power plant 3000 comprises an engine 3100 mounted substantially above and behind the cabin 1100, in this embodiment the engine 3100 is a gas turbine, or turboshaft, engine 3100, and more preferably the engine 3100 is the Hill GT50 engine 3100. In this embodiment, the engine 3100 produces 500 horsepower and is operable to run on either jet fuel or biofuel.

The engine 3100 has an engine shaft 3106 arranged to provide power to the tail rotor 1250 and the main rotor assembly 2000. Specifically, the engine 3100 comprises an engine gearbox 3114 which steps down the rotational speed from the engine shaft 3106 to an engine driveshaft 3220. the engine driveshaft 3220 provides power to the main rotor assembly 2000 via a transmission unit 3200 and to the tail rotor 1250 via a tail rotor driveshaft 3250 and a tail rotor gearbox 3260, the engine gearbox 3210 including an engine driveshaft 3220.

The engine inlet 3108 is positioned at the front of the engine 3100, and in this embodiment the engine inlet 3108 is preferably positioned in the fuselage shell 1010 on either side of the main rotor assembly 2000.

The engine turbine 3104 produces hot gas which is expelled through an exhaust collector 3110. The exhaust collector 3110 is also shaped such that it is operable to function as a silencer to reduce the engine noise in the cabin. The exhaust collector 3110 outlet is preferably positioned in the fuselage shell 1010 behind the main rotor assembly 2000.

The engine 3100 also comprises an engine gearbox 3114 which steps down the rotational speed from the engine shaft 3106 to the engine driveshaft 3220 and the tail rotor driveshaft 3250. In this embodiment, the engine gearbox 3114 comprises helical gears arranged vertically such that the engine shaft 3106, the engine driveshaft 3220 and the tail rotor shaft 3250 are arranged parallel and next to one another. The specific organisation of the helical gears 3212 provides different step-down factors for each of the engine driveshaft 3220 and the tail rotor driveshaft 3250 such that the tail rotor 1250 rotates at a higher rotational speed than the main rotor assembly 2000.

The engine driveshaft 3220 provides power to the transmission unit 3200. In this embodiment, the engine driveshaft 3220 is connected at a first end to a second end of the main rotor driveshaft 3230 through a helical gear 3212 arrangement. As the main rotor assembly 2000 is positioned in front of and above the power plant 3000, the main rotor driveshaft 3230 is tilted from the engine driveshaft 3220 upwards and towards the front of the helicopter 100. As the main rotor assembly 2000 is substantially vertical with respect to the helicopter fuselage 1000, the helical gear arrangement at each end of the main rotor driveshaft 3230 is bevelled such that the axis of rotation of the shafts can be changed from substantially horizontal at the engine driveshaft 3220 to substantially vertical at the rotor mast 2104. The first end of the main rotor driveshaft 3230 is connected to the main rotor gearbox 3240. The main rotor gearbox 3240 provides the drive power to the rotor mast 2104.

Referring to FIG. 7b, the main rotor assembly 2000 comprises a rotor control assembly 2100, which includes the mechanical components for translating the input from the main rotor gearbox 3240 into rotation of the blades 2102, and the rotor fairing assembly 2200 which provides protection to the rotor control assembly 2100.

The rotor control assembly 2100 comprises at least two blades 2102 which is the minimum requirement for a helicopter 100 to maintain a thrust vector with a standard swashplate 2108, 2110. In this embodiment, due to the design requirements, the rotor control assembly 2000 preferably comprises three blades 2102. The blades 2102 are positioned at equal spacing (i.e. 120° apart) around the rotor mast 2104 so that the thrust vector is stable.

As shown in more detail in FIG. 7b, the blades 2102 are connected to the rotor hub 2106. In this embodiment, the rotor control assembly 2100 comprises a "fully articulated" structure, which is a known structure in helicopter dynamics, comprising a flapping hinge 2146 and a lead-lag hinge 2144.

The blades 2102 further comprise the flapping hinge 2146 at the blade 2102 root (i.e. the end of the blade 2102 nearest to the rotor hub 2104). Preferably, the flapping hinge 2146 comprises elastomeric bearings, however, other bearing types may also be suitable depending on the design requirements.

The flapping hinge 2146 allows the blade 2102 to flap upwards when the blade 2102 loading is increased. The angle that the blade makes with the rotor hub 2104 plane is known as the coning angle.

The rotor hub 2106 is mounted onto the top end of the rotor mast 2104. The rotation of the rotor mast 2104 is therefore directly inputted into the rotor hub 2106 and consequently the blades 2102.

The upper control links 2116 are connected at a first end to the rotor hub 2016. The number of upper control links 2116 is determined by the number of blades 2102, therefore, in this embodiment, the number of upper control links 2116 is three. In this embodiment, the rotor hub 2106 comprises a strap arrangement in which the rotor hub straps 2108 wrap over rotor hub bars 2110. The upper control links 2116 connect to the rotor hub straps 2108 and the input from the upper control links 2116, either up or down, causes the strap to twist the rotor hub bars 2110. As the rotor hub bars 2110 are connected to the blades 2102, the twisting of the rotor hub bars 2110 causes the blades 2102 to twist.

The upper control links 2116 are connected at a second end to the swashplate arrangement, specifically, to the upper swashplate 2112. In this embodiment, the three upper control links 2112 are positioned at equal spacing (i.e. 120° apart) around the rotor mast 2104 so that the upper control links 2112 align with a part of the blades 2102.

The upper swashplate 2112 rests upon the lower swashplate 2114. The structure of the swashplate 2112, 2114 in this embodiment is in line with the normal structure for a helicopter 100 with the sizing and strength suitable for the design requirements.

The swashplate arrangement 2112, 2114 is free to move vertically up or down (due to collective input), and tilt around the rotor mast 2104 (due to cyclic input). The input from the swashplate 2112, 2114 can cause the upper control links 2116 to move vertically. If the swashplate 2112, 2114 moves purely vertically then all the upper control links 2116 will move cooperatively. If the swashplate 2112, 2114 tilts then upper control links 2116 will move in different directions. The further the upper control link 2116 moves, the further the connected blade 2102 tilts. If the blade 2102 is tilted up, then the angle of attack increases which can result in an increase in lift coefficient.

The rotor control assembly 2100 also comprises at least one lower control link(s) connected at a first end to the lower swashplate 2114. In the illustrated embodiment, three lower control links 2118, 2120, 2122 provide the input into the lower swashplate 2114 either to move the swashplate 2112, 2114 vertically or to tilt the angle, as mentioned above. In this embodiment, the lower control link 2118, 2120, 2122 can only move vertically. The lower control link 2118, 2120, 2122 can move cooperatively to move the swashplate 2112, 2114 vertically or move by different amounts to tilt the swashplate 2112, 2114.

The lower control link 2118, 2120, 2122 are connected at a second end to corresponding control arms 2124, 2126, 2128. The control arms 2124, 2126, 2128 provide the input into the lower control links 2118, 2120, 2122 by moving the second end of the lower control links 2118, 2120, 2122 vertically.

The control arms 2124, 2126, 2128 are connected at a second end to control bars 2130, 2132, 2134. The control bars 2130, 2132, 2134 provide the input into the control arms 2124, 2126, 2128 by moving the second end of the control arms 2124, 2126, 2128 vertically.

The control bars 2130, 2132, 2134 are connected at a second end to at least one pilot input levers 2136, 2138, as shown in FIG. 7a.

In the illustrated embodiment, each control arm 2124, 2126, 2128 is connected to a control bar 2130, 2132, 2134 aft of the rotor mast 2104. In other words, all the control arms 2124, 2126, 2128 connect to the control bars 2130, 2132, 2134 behind the rotor mast 2104. By connecting the control arms 2124, 2126, 2128 and the control bars 2130, 2132, 2134 aft of the rotor mast 2104 the connection may be shielded from bird strike by the rotor mast 2104 and other components.

Further, if there are fewer components fwd of the rotor mast 2104 and more components aft of the rotor mast 2104 then this may improve the aerodynamics of the main rotor assembly 2000. As the rotor mast 2104 is a large and generally rounded component, any components aft of the rotor mast 2104 are likely to benefit from reduced parasitic drag caused by the wake of the rotor mast 2104. In other words, if the components are positioned aft of the rotor mast 2104 then they are less likely to experience direct incoming airflow and produce parasitic drag.

Further, as mentioned later, in this embodiment, the connection between the control arms 2124, 2126, 2128 and the control bars 2130, 2132, 2134 is enclosed by a pylon fairing 2204 and as the connection is aft of the rotor mast this can enable the section of the pylon fairing 2204 that is fwd of the rotor mast 2104 to form a more aerodynamic shape. For example, the pylon fairing 2204 can form an aerofoil shape. The aerofoil shape may improve the likelihood of maintaining attached laminar airflow over the pylon fairing 2204 as the adverse pressure gradient can be reduced.

In this embodiment, the connection between the control arms 2124, 2126, 2128 and the control bars 2130, 2132, 2134 is a pin joint to enable the elements to rotate without displacement relative to one another.

In this embodiment, the rotor control assembly 2100 comprises three control bars 2130, 2132, 2134; a collective control bar 2130, a first cyclic control bar 2132 and a second cyclic control bar 2134. As shown in FIG. 7a, the collective pilot input leaver 2136 provides the input for the collective control bar 2130 through an actuator. The cyclic input leaver 2138 provides the input for both the first cyclic control bar 2132 and the second cyclic control bar 2134 through actuators.

In this embodiment, the rotor control assembly 2100 comprises three control arms 2124, 2126, 2128; a collective control arm 2124, a first cyclic control arm 2126 and a second cyclic control arm 2128 connected to the corresponding control bars 2130, 2132, 2134.

In this embodiment, the rotor control assembly 2100 comprises three lower control links 2118, 2120, 2122; a collective lower control link 2118, a first cyclic lower control link 2120 and a second cyclic lower control link 2122 connected to the corresponding control arms 2124, 2126, 2128.

This embodiment uses three separate control arms 2124, 2126, 2128 which are connected to one another, as shown in FIG. 7b. By connecting the control arms 2124, 2126, 2128 to one another it reduces the likelihood of the control arms 2124, 2126, 2128 separating due to lateral forces caused by the pilot input or by feedback from the rotor hub 2106.

It is preferable that the control arms 2124, 2126, 2128 are each coupled to the same tilting point and that the control arms 2124, 2126, 2128 are free to tilt about the tilting point in different, or the same, directions as one another. In other words, the tilting point provides a hinged axis that allows each of the control arms 2124, 2126, 2128 to tilt freely and independently.

By allowing the control arms 2124, 2126, 2128 to move independently it means that the cyclic and collective inputs can be input independently or cooperatively. In this embodiment, the collective control arm 2124 is central and is flanked by the first cyclic control arm 2126 (on the port side) and the second cyclic control arm 2128 (on the starboard side).

The collective input only moves the collective control arm 2124 vertically at the second end which causes a corresponding movement at the first end of the collective control arm 2124. As mentioned above, the vertical deflection of the first end of the collective control arm 2124 consequently changes the angle of attack by the same amount for all blades 2102.

The cyclic input only moves the first cyclic control arm 2126 and the second cyclic control arm 2128 at the second end which causes a corresponding movement at the first end of the first cyclic control arm 2126 and the second cyclic control arm 2128. It is also possible that the movement of the second end of the first cyclic control arm 2126 and the second cyclic control arm 2128 causes a movement of the second end of the collective control arm 2124. As mentioned above, the vertical deflection of the first end of the first cyclic control arm 2126 and the second cyclic control arm 2128 consequently changes the angle of attack of each of the blades 2102 by different amounts depending on the blade 2102 azimuthal position. The change in the angle of attack of each independent blade 2102 is dependent on the amount each of the first ends of the cyclic control arms 2126, 2128 move. For example, if the first end of the first cyclic control arm 2126 moves upward and the first end of the second cyclic control arm 2128 moves downward then the blades 2102 will increase angle of attack when in a port side azimuthal position, and will decrease angle of attack when in a starboard side azimuthal position.

Further, by connecting the control arms 2124, 2126, 2128 at a single point this provides a stationary point for mounting the control arms 2124, 2126, 2128 to a single supporting structure. This can reduce the number of components needed to support the blade control assembly 2100.

The rotor fairing assembly 2200, as illustrated in FIGS. 6 and 7b, can be used to enclose a rotor control assembly 2100. In this embodiment, the rotor fairing assembly 2200 is used to enclose the previously described rotor control assembly 2100, however, the rotor fairing assembly 2200 as claimed may be suitable for use with a range of rotor control assemblies 2100 and helicopters 100.

The rotor fairing assembly 2200 comprises a rotatable rotor hub fairing 2202. The rotor hub fairing 2202 rotates with the blades 2102, rotor mast 2104 and rotor hub 2106 relative to the helicopter 100 body.

The rotor fairing assembly 2200 also comprises a static pylon fairing 2204. The pylon fairing 2204 is static relative to the helicopter 100 body.

FIG. 6 clearly shows the rotor hub fairing 2202 is used to enclose the rotor hub 2106, at least part of the rotor mast 2104 and at least part of the upper control links 2116. The pylon fairing 2204 is used to enclose at least part of the rotor mast 2104, at least part of the upper control links 2116, the upper swash plate 2112, the lower swash plate 2114, the lower control links 2118, 2120, 2122 and the control arms 2124. 2126. 2128.

The term "enclosed" as used herein is defined as substantially surrounding the components such that the incoming airflow is unable to stagnate, or slow down, upon hitting the internal components. In other words, the internal components do not experience the full incoming airflow velocity as they are shielded by the fairings 2202, 2204.

In relation to the upper control links 2116 and the rotor mast 2104, the term "at least part of" means that at least some of the components are enclosed by the rotor hub fairing 2202 and at least some of the components are enclosed by the pylon fairing 2204.

By enclosing the internal components, the internal components are shielded from bird strike by the structure of the rotor hub fairing 2202 and the pylon fairing 2204. Several of the internal components, such as the upper control links 2116 and the lower control link(s) 2118, 2120, 2122, can comprise thin and fragile structures while also providing a fundamental function in the control of the blades 2102. Therefore, by protecting the fragile internal components from bird strike it may significantly reduce the risk of damage which could cause the helicopter 100 control mechanics to be compromised.

The enclosure of internal components may also have significant aerodynamic benefits as the rotor hub fairing 2202 and the pylon fairing 2204 can be designed to reduce the parasitic drag of the helicopter 100. Parasitic drag increases with velocity squared and is often the largest power drain for most helicopters 100 at high forward velocity. The internal components, such as the upper control links 2116 and the lower control link(s) 2118, 2120, 2122, often have poor aerodynamic properties as they may produce very unsteady airflow behind the main rotor assembly 2000. In particular, the upper control links 2116, in this embodiment, form uprights which rotate at very high speed which can produce a very unsteady vortical airflow with detrimental effects on the parasitic drag. Therefore, in a helicopter 100 that is principally concerned with maximum and cruising forward flight speed, as described herein, enclosing the internal components could greatly increase the maximum flight speed.

As the rotor hub fairing 2202 is rotatable, it is likely it will still have a vortical effect on the airflow behind the main rotor assembly 2000. Therefore, it is preferable that the rotor hub fairing 2202 is designed in an aerodynamic shape to minimise the effect on the trailing airflow. In this embodiment, the rotor hub fairing 2202 generally forms an oblate spheroid with the elliptical major axis aligned with the central axis of the rotor mast 2104 and the elliptical minor axis parallel to the plane of the rotor hub 2106. With this design the effect of the rotor hubing fairing 2202 on the downstream air flow may be minimised.

As the pylon fairing 2204 is static in relation to the helicopter 100, and parasitic drag is most significant during forward flight, it is therefore preferable to design the pylon fairing 2204 to be the most aerodynamic in forward flight. In this embodiment the pylon fairing 2204 generally forms an aerofoil section when viewed from above with the wider section facing the incoming airflow. The pylon fairing 2204 generally form half aerofoil section when viewed from the side with the wider section facing the incoming airflow. An aerofoil section, or teardrop shaped section, is known in the field of aerodynamics to be an efficient design for aerodynamics as the shape aims to maintain attached lamina flow along the surface and cleanly re-join the streamlines downstream of the aerofoil.

The pylon fairing design illustrated in this embodiment may be applied to other rotor control assemblies 2100 and helicopters 100. However, the design of the rotor control assembly 2100 as mentioned above can significantly assist the effectiveness of the pylon fairing 2204. The widest section of the aerofoil is substantially aligned with the centre line of the rotor mast 2104 and the elongate section of the aerofoil extends behind the rotor mast 2104. As most of the components of the rotor control assembly 2100, in this embodiment, are positioned behind the rotor mast 2104 and have been designed to be elongate, the components are suitable for fitting into the elongate section of the aerofoil shaped pylon fairing 2204. In this embodiment, any internal components that are positioned in front of the rotor mast 2102, such as the upper control links 2116, are designed to be close to the rotor mast 2102, such as by positioning the titling axis aft of the rotor mast 2102, so that they fit into the shorter front section of the aerofoil shaped pylon fairing 2204.

In this embodiment, the rotor hub fairing 2202 comprises a void 2206 on a lower surface and the pylon faring 2204 comprises a void 2208 on an upper surface. The lower surface is located on the lowest point of the rotor hub fairing 2202 and the upper surface is located on the highest point on the pylon fairing 2204. The pylon fairing void 2208 and the rotor hub fairing void 2206 allows the upper control links 2116 and the rotor mast 2102 to extend out of pylon fairing 2204 and into the rotor hub fairing 2202. The upper control links 2116 and the rotor hub 2106 are rotating components and require the pylon fairing void 2208 and the rotor hub fairing void 2206 to translate the rotational movement from inside one enclosed structure to another.

In this embodiment, the pylon fairing void 2208 and the rotor hub fairing void 2206 align with one another. The alignment may help to provide a tighter "closure" between pylon fairing void 2208 and the rotor hub fairing void 2206 so that the internal components are less likely to experience the incoming air flow. Further, the pylon fairing void 2208 and the rotor hub fairing void 2206 maybe also comprise a circular shape so that the alignment is maintained when the rotor hub fairing 2202 rotates.

It is also preferable that the distance between the lower surface of the pylon fairing void 2208 and the upper surface of the rotor hub fairing void 2206 is less than 20 mm, more preferably less than 10 mm. By minimising the distance between the lower surface of the pylon fairing void 2208 and the upper surface of the rotor hub fairing void 2206 this may also provide a tighter "closure" between pylon fairing void 2208 and the rotor hub fairing void 2206 so that the internal components are less likely to experience the incoming air flow.

In this embodiment, the rotor hub fairing 2202 further comprises blade apertures 2210 for allowing the blades to connect to the rotor hub. In this embodiment, there are three rotor hub fairing blade apertures 2210 as the rotor control assembly 2100 comprises three blades 2102. However, the number of rotor hub fairing blade apertures 2210 can be varied depending on the number of blades 2102. As the blades 2210 are not enclosed by the rotor hub fairing 2202, the blades must extend through the rotor hub fairing 2202 to connect with the rotor hub 2106. In this embodiment, which comprises flapping and lead-lag hinges 2144, the hinges are also enclosed by the rotor hub fairing 2202 to reduce the aerodynamic and bird strike disadvantages.

The pylon fairing 2204 is preferably mounted onto an upper section of the fuselage 1000, as shown in FIG. 6. More preferably, the pylon fairing 2204 may be an integrated section of the fuselage shell 1010. In other words, the pylon fairing 2204 is part of the fuselage shell 1010, i.e. the same component. By mounting the pylon fairing 2204 onto the fuselage 1000 this provides a supporting structure for the pylon fairing 2204. By integrating the pylon fairing 2204 into the fuselage shell 1010 this may provide some aerodynamic benefits as there may no longer be a seam, or gap, between the pylon fairing 2204 and the fuselage shell 1010 which may improve the aerodynamics.

The powerplant is mounted with the axis substantially horizontal and above the level of the passenger cabin but below the level of the top of the fuselage fairing and has an angled driveshaft extending upwardly and forwardly to a main rotor gearbox. This allows a much more aerodynamic arrangement than having the turbine exposed on an upper deck while reducing intrusion of the turbine or driveshaft into the cabin. Preferably the transmission comprises a first spiral bevel gear driving the angled driveshaft and a second spiral bevel gear driving a main gear assembly having a vertical axis coupled to the main rotor mast. The powerplant here comprises a turbine mounted with the axis of rotation generally horizontal but it may be mounted at a slight angle, preferably less than 20 degrees to horizontal and the driveshaft here extends upwards at 45 degrees but it may extend upward at between 30 and 60 degrees to the horizontal.

It has also been found that keeping convex and preferably continuous curvature along the major length of the fuselage can surprisingly improve aerodynamics in the complex varying flight conditions a helicopter experiences. It is usual to have relatively flat, slab-sided doors on helicopters, both for manufacturing ease and to constrain dimensions as these are not the biggest contributors to drag. However it is found that in efficient designs pursuant to the invention significant improvements can be achieved by this measure.

In preferred embodiments a representative horizontal section through the cabin over at least 20% of the height of the cabin (often 50% or more, ideally from below the "waist" or widest point or level of seat squabs up to shoulder height at least) including or adjacent the vertical midpoint of the cabin defines a convex outer sidewall curvature from at least a line forward of the front seating position to rearward of the primary fuel cell position. The convex curvature preferably extends to the nose and behind the fuel cell to the tail assembly. By representative section is meant a section which approximates the general outline—there may be minor features such as lights or door features or handles (although these are preferably substantially recessed) which should be discounted. Similarly, preferably the curvature of the fuselage outer is substantially continuous such that the, where x is the forward direction, y is the sideways direction and z is the vertical direction, the second partial derivative d2y/dx^2 has substantially no discontinuities over at least 75% of the area of the side of the fuselage. This absence of discontinuities is preferably also true for the second partial derivative d2y/dx^2 over the same area. This implies no blunt joining of unlike curves. It has been found that in hover, transition and high-speed (over 75 m/s) forward flight in particular. Particularly if the helicopter has (which is another independent preferred feature) a generally smooth surface finish, such discontinuities can add to drag measurably.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A light helicopter having an occupant capacity of at least 4 occupants and at most 6 occupants including a pilot, the helicopter having a longitudinal axis and an empty mass of less than 1000 kg and a maximum gross mass of between 1000 kg and 2000 kg, the helicopter comprising:
   a fuselage elongate along the longitudinal axis, the fuselage comprising an aerodynamically shaped shell defining a front, a rear, a top and a bottom of the fuselage and a passenger cabin therein having two forward-facing front seating positions for the pilot and a co-pilot or a passenger, and forward-facing rear seating positions for at least 2 passengers, optionally 3 passengers, the shell being formed from a composite material and being load-bearing, the cabin having a maximum width of between 1250 mm and 1950 mm at a section located longitudinally proximately to the rear seating positions, a primary fuel cell mounted substantially behind the passenger cabin, and the fuselage having a frontal cross-sectional area of between 1.75 m² and 4 m², tapering substantially smoothly to the tail boom assembly, and having a forward fuselage length from a nose at the front of the fuselage to a tail boom bulkhead of at least 3500 mm;
   a tail boom assembly extending from the tail boom bulkhead and including a tail rotor; a main rotor assembly comprising a hub, at least two main rotor blades mounted by a rotor mast to the top of the fuselage to permit the main rotor blades to rotate with respect to the fuselage, and a swashplate assembly, the swashplate assembly having a rotatable upper swashplate coupled by upper control links to the main rotor blades and a lower swashplate coupled to cyclic and collective controls, the main rotor assembly having a centre of rotation at a rotor hub location between 2500 mm and 3500 mm along the longitudinal axis from the front of the fuselage, the front seating position for the pilot having a centre of mass at a first location substantially in front of the rotor hub location, and a primary fuel cell having a centre of mass at a second location substantially behind the rotor hub location;
   a landing gear arrangement; and
   a power plant mounted substantially above and behind the passenger cabin, wherein the primary fuel cell is arranged to provide fuel to the power plant; wherein in level forward flight at 70 m/s in an International Standard Atmosphere at an altitude of 600 m with a total mass of 1650 kg the helicopter has an equivalent flat plate drag of 0.5 m² or less resulting in a total effective drag of less than 1500 N and a total power consumption required to sustain said level forward flight of less than 230 kW.

2. The helicopter according to claim 1 having a secondary fuel cell remote from the primary fuel cell having a centre of mass forward of the rotor hub location.

3. The helicopter according to claim 2 wherein the secondary fuel cell has one or more of:
   a centre of mass forward of the centre of mass of the helicopter cabin;
   a centre of mass at least 1 m forward of the centre of mass of the primary fuel cell; and
   a volume of at least 50 litres.

4. The helicopter according to claim 1, wherein the main rotor assembly further comprises:
   an aerodynamic rotor hub fairing mounted on and arranged to rotate with the hub; and
   an aerodynamic pylon fairing disposed above the passenger cabin and having a void in which the swashplate assembly is positioned and in which at least a part of the upper control links rotates;
   wherein the pylon fairing aerodynamically co-operates with the rotor hub fairing whereby airflow substantially parallel to the longitudinal axis is substantially diverted by the rotor hub fairing and pylon fairing around the mast and upper control links.

5. The helicopter according to claim 1, wherein the landing gear arrangement comprises:
   main wheels each retractable into an aerodynamic wheel fairing in the rear of the fuselage behind the rear seating positions; and
   at least one nose wheel retractable into a forward portion of the fuselage forward of the front seating positions;
   wherein, when deployed, the main wheels extend outwardly, downwardly and rearwardly of the fuselage and define a track having a width greater than the maximum cabin width.

6. The helicopter according to claim 5, wherein the landing gear arrangement further comprises one or more skid plates coupled to one or more of the main wheels and the nose wheel, the one or more skid plates extending in front, around and behind the one or more of the main wheels and the nose wheel.

7. The helicopter according to claim 1, wherein the first location is in front of the rotor hub location by a maximum of 1500 mm, and wherein the second location is behind the rotor hub location by a maximum of 1000 mm.

8. The helicopter according to claim 1, wherein in level forward flight one or more of the following is specified:
- at 70 m/s in an International Standard Atmosphere (ISA) at sea level with a total mass of 1650 kg, the helicopter has a total parasite drag of less than 1500 N and a total power consumption required to sustain said level forward flight of less than 230 kW, preferably a total effective drag of less than 1,200 N and a total power consumption of less than 207 kW; and
- at a cruising speed of 70 m/s in an ISA at an altitude of 600 m with a total mass of 1650 kg:
  - the parasitic drag on the helicopter is less than 1500 N; and
  - the induced drag on the helicopter is less than 500 N; and
- at 80 m/s, the power plant has a fuel consumption of 135 litres per hour or less, preferably 115 litres per hour or less; and
- at 85 m/s in an ISA at sea level with a total mass of 1650 kg, the helicopter has a total effective drag of less than 2,170 N and a total power consumption required to sustain said level forward flight of less than 325 kW, preferably a total effective drag of less than 1,734 N and a total power consumption of less than 290 kW; and
- at 85 m/s, the power plant has a fuel consumption of 150 litres per hour or less, preferably 130 litres per hour or less.

9. The helicopter according to claim 1, wherein the power plant has a continuous power rating of at least around 275 KW, preferably around 300 kW, optionally wherein the power plant has a continuous power rating of less than around 375 kW.

10. The helicopter according to claims 7, wherein the primary fuel cell has a fuel capacity of at least 400 litres, preferably 600 litres or more, and the empty mass, the maximum gross mass and fuel consumption at a cruise speed of 75 m/s or more give a range of at least 750 km with a passenger payload of 400 kg.

11. The helicopter according to claim 1, wherein the helicopter has a maximum cruising speed of at least around 72 m/s, preferably around 90 m/s.

12. The helicopter according to claim 1, wherein the power plant comprises a turbine engine and a transmission unit coupling the turbine engine to the main rotor assembly and to the tail rotor, optionally wherein the turbine engine and the transmission unit have a combined mass of between 175 kg and 250 kg.

13. The helicopter according to claim 12, wherein the power plant further comprises a second turbine engine with a maximum continuous power output of no more than around 350 kW, preferably around 300 kW.

14. The helicopter according to claim 1, wherein the maximum gross mass is at least 1250 kg.

15. The helicopter according to claim 1, wherein a representative horizontal section through the cabin over at least 20% of the height of the cabin including or adjacent the vertical midpoint of the cabin defines a convex outer sidewall curvature from at least a line forward of the front seating position to rearward of the primary fuel cell position.

16. The helicopter according to claim 1, wherein the curvature of the fuselage outer is substantially continuous such that the, where x is the forward direction, y is the sideways direction and z is the vertical direction, the second derivative dy/dx^2 has substantially no discontinuities over at least 75% of the area of the side of the fuselage.

17. The helicopter according to claim 1, having a generally smooth surface finish and continuous curvature over at least 75% of the exterior and a convex shaped main cabin wherein the major portion of the fuselage is convex in both a horizontal and vertical section.

18. The helicopter according to claim 1, wherein the powerplant is mounted with the axis substantially horizontal and above the level of the passenger cabin but below the level of the top of the fuselage fairing and has an angled driveshaft extending upwardly and forwardly to a main rotor gearbox.

19. The helicopter according to claim 18, wherein the powerplant comprises a turbine mounted with the axis of rotation at less than 20 degrees to horizontal and having a driveshaft extending upward at between 30 and 60 degrees to the horizontal.

20. A light helicopter having an occupant capacity of at least 4 occupants and at most 6 occupants including a pilot, the helicopter having a longitudinal axis and an empty mass of less than 1000 kg and a maximum gross mass of between 1000 kg and 2000 kg, the helicopter comprising:
- a fuselage elongate along the longitudinal axis, the fuselage comprising an aerodynamically shaped shell defining a front, a rear, a top and a bottom of the fuselage and a passenger cabin therein having two forward-facing front seating positions for the pilot and a co-pilot or a passenger, and forward-facing rear seating positions for at least 2 passengers, optionally 3 passengers, the shell being formed from a composite material and being load-bearing, the cabin having a maximum width of between 1250 mm and 1950 mm at a section located longitudinally proximately to the rear seating positions, a primary fuel cell mounted substantially behind the passenger cabin, and the fuselage having a frontal cross-sectional area of between 1.75 m$^2$ and 4 m$^2$, tapering substantially smoothly to the tail boom assembly, and having a forward fuselage length from a nose at the front of the fuselage to a tail boom bulkhead of at least 3500 mm;
- a tail boom assembly extending from the tail boom bulkhead and including a tail rotor;
- a main rotor assembly comprising a hub, at least two main rotor blades mounted by a rotor mast to the top of the fuselage to permit the main rotor blades to rotate with respect to the fuselage, and a swashplate assembly, the swashplate assembly having a rotatable upper swashplate coupled by upper control links to the main rotor blades and a lower swashplate coupled to cyclic and collective controls, the main rotor assembly having a centre of rotation at a rotor hub location between 2500 mm and 3500 mm along the longitudinal axis from the front of the fuselage, the front seating position for the pilot having a centre of mass at a first location substantially in front of the rotor hub location;
- a primary fuel cell having a capacity of at least 400 litres and a centre of mass at a second location substantially behind the rotor hub location;
- a secondary fuel cell having a capacity of between 50 litres and 350 litres and a centre of mass at a third location forward of the first location;
- a landing gear arrangement; and
- a power plant mounted substantially above and behind the passenger cabin;
- wherein at least the primary fuel cell is arranged to provide fuel to the power plant in flight and wherein the relative amounts of fuel in the primary and secondary fuel cells and/or the rate of consumption of fuel from the primary and secondary fuel cells is controllable in flight; wherein in level forward flight at 70 m/s in an International Standard Atmosphere at an altitude of 600 m with a total mass of 1650 kg the helicopter has an equivalent flat plate drag of 0.5 m$^2$ or less resulting in a total effective drag of less than 1500 N and a total power consumption required to sustain said level forward flight of less than 230 kW.

* * * * *